(12) United States Patent
Kang et al.

(10) Patent No.: US 11,513,770 B2
(45) Date of Patent: Nov. 29, 2022

(54) NEURAL NETWORK METHOD AND APPARATUS WITH FLOATING POINT PROCESSING

(71) Applicant: Samsung Electronics Co., Ltd., Suwon-si (KR)

(72) Inventors: Shinhaeng Kang, Suwon-si (KR); Sukhan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/909,214

(22) Filed: Jun. 23, 2020

(65) Prior Publication Data
US 2021/0200513 A1    Jul. 1, 2021

(30) Foreign Application Priority Data
Dec. 30, 2019  (KR) ........................ 10-2019-0178509

(51) Int. Cl.
| | |
|---|---|
| *G06F 7/487* | (2006.01) |
| *G06F 7/544* | (2006.01) |
| *G06F 5/01* | (2006.01) |
| *G06F 9/30* | (2018.01) |

(52) U.S. Cl.
CPC ............ *G06F 7/4876* (2013.01); *G06F 5/012* (2013.01); *G06F 7/5443* (2013.01); *G06F 9/3001* (2013.01)

(58) Field of Classification Search
CPC .... G06F 7/4876; G06F 7/5443; G06F 9/3001; G06N 3/063
See application file for complete search history.

(56) References Cited

U.S. PATENT DOCUMENTS

| | | | |
|---|---|---|---|
| 5,631,859 A | 5/1997 | Markstein et al. | |
| 6,801,924 B1 * | 10/2004 | Green | G06F 9/30025 708/204 |
| 8,301,576 B2 | 10/2012 | Meng et al. | |

(Continued)

OTHER PUBLICATIONS

Brunie, Nicolas, et al., "A mixed-precision fused multiply and add," 2011 *Conference Record of the Forty Fifth Asilomar Conference on Signals, Systems and Computers (ASILOMAR). IEEE*, Nov. 17, 2011 (pp. 1-7).

(Continued)

*Primary Examiner* — Emily E Larocque
(74) *Attorney, Agent, or Firm* — NSIP Law

(57) ABSTRACT

A processor-implemented includes receiving a first floating point operand and a second floating point operand, each having an n-bit format comprising a sign field, an exponent field, and a significand field, normalizing a binary value obtained by performing arithmetic operations for fields corresponding to each other in the first and second floating point operands for an n-bit multiplication operation, determining whether the normalized binary value is a number that is representable in the n-bit format or an extended normal number that is not representable in the n-bit format, according to a result of the determining, encoding the normalized binary value using an extension bit format in which an extension pin identifying whether the normalized binary value is the extended normal number is added to the n-bit format, and outputting the encoded binary value using the extended bit format, as a result of the n-bit multiplication operation.

22 Claims, 16 Drawing Sheets

(56) References Cited

U.S. PATENT DOCUMENTS

| | | | |
|---|---|---|---|
| 9,223,753 | B2 | 12/2015 | Hickey et al. |
| 9,710,265 | B1 | 7/2017 | Temam et al. |
| 10,096,134 | B2 | 10/2018 | Yan et al. |
| 2005/0188179 | A1 | 8/2005 | Henry et al. |
| 2013/0191432 | A1 | 7/2013 | Hickey et al. |
| 2014/0089371 | A1 | 3/2014 | Dupont De Dinechin et al. |
| 2016/0328647 | A1 | 11/2016 | Lin et al. |
| 2017/0193361 | A1 | 7/2017 | Chilimbi et al. |
| 2018/0121168 | A1* | 5/2018 | Langhammer .......... G06F 7/483 |
| 2019/0042243 | A1 | 2/2019 | Tang |
| 2019/0042544 | A1 | 2/2019 | Kashyap et al. |
| 2019/0079728 | A1 | 3/2019 | Langhammer et al. |
| 2020/0134475 | A1* | 4/2020 | Hill ........................ G06N 3/063 |

OTHER PUBLICATIONS

European Office Action dated Jan. 27, 2021 in counterpart European Patent Application No. 20190013.1 (7 pages in English).

\* cited by examiner

FIG. 5

[FORMAT OF HALF PRECISION FLOATING POINT (FP16) DEFINED IN IEEE 754 STANDARD]

510

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| sign | exponent | | | | | significand | | | | | | | | | |

[DECODING TABLE OF FP16 FORMAT]

520

| Exponent | Significand = zero | Significand ≠ zero | Equation |
|---|---|---|---|
| 00000 | zero, −0 | Subnormal number | $(-1)^{signbit} \times 2^{-14} \times 0.significantbits_2$ |
| 00001 ~ 11110 | Normal Value | | $(-1)^{signbit} \times 2^{exponent-15} \times 1.significantbits_2$ |
| 11111 | infinity | NaN | |

FIG. 12

| Extension pin | Exponent | Significand = zero | Significand ≠ zero | Equation |
|---|---|---|---|---|
| 0 | 00000 | zero, −0 | Subnormal number | $(-1)^{signbit} \times 2^{-46} \times 0.significantbits_2$ |
| 1 | 00000 ~ 11111 | Extended Normalized Value | | $(-1)^{signbit} \times 2^{exponent-46} \times 1.significantbits_2$ |
| 0 | 00001 ~ 11110 | Normal Value | | $(-1)^{signbit} \times 2^{exponent-15} \times 1.significantbits_2$ |
| 0 | 11111 | infinity | NaN | |

1210

[DYNAMIC RANGE OF EXTENDED BIT FORMAT]

log2(magnitude): −56 . −47 −46 . −15 −14 . 15

| Subnormal number | Extended Normal number | Normal number |

1220

NEURAL NETWORK METHOD AND APPARATUS WITH FLOATING POINT PROCESSING

CROSS-REFERENCE TO RELATED APPLICATIONS

This application claims the benefit under 35 USC 119(a) of Korean Patent Application No. 10-2019-0178509 filed on Dec. 30, 2019, in the Korean Intellectual Property Office, the entire disclosure of which is incorporated herein by reference for all purposes.

BACKGROUND

1. Field

The following description relates to methods and apparatuses with floating point processing.

2. Description of Related Art

A neural network may be a computing system implemented with reference to a hardware computational architecture. Neural network technologies may analyze input data and extract valid information therefrom.

Neural network devices typically require large amounts of computation of complex input data. In order for a typical neural network device to process a large number of computations, an operation of reading or writing large amounts of data is typically necessarily performed for the computation from or to memory, and thus, a large amount of energy may be consumed due to frequent memory access. Low-power and high-performance systems, such as mobile or Internet of Things (IoT) devices, typically have limited resources, and thus typically require technologies that reduce energy consumption required to process a large amount of data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method, includes receiving a first floating point operand and a second floating point operand, each having an n-bit format including a sign field, an exponent field, and a significand field, wherein n is a natural number, normalizing a binary value obtained by performing arithmetic operations for fields corresponding to each other in the first and second floating point operands for an n-bit multiplication operation, determining whether the normalized binary value is a number that is representable in the n-bit format or an extended normal number that is not representable in the n-bit format, according to a result of the determining, encoding the normalized binary value using an extension bit format in which an extension pin identifying whether the normalized binary value is the extended normal number is added to the n-bit format, and outputting the encoded binary value using the extended bit format, as a result of the n-bit multiplication operation between the first and second floating point operands.

The number that may be representable in the n-bit format may be a normal number or a subnormal number, and the extended normal number may not be included in a dynamic range of the normal number and may not be included in a dynamic range of the subnormal number.

The determining may include determining whether the normalized binary value is the normal number, the subnormal number, or the extended normal number, based on an exponent of the normalized binary value.

An arithmetic operation may be a convolution operation.

The extension pin may have a first value when the normalized binary value is a normal number or a subnormal number that may be representable in the n-bit format, and may have a second value when the normalized binary value is the extended normal number.

A dynamic range of the extended normal number may be a range representing a positive number or a negative number having an absolute value that is smaller than an absolute value of a subnormal number that is representable in the n-bit format.

The determining may include, when an exponent of the normalized binary value is included in a dynamic range of a normal number that is representable in the n-bit format, determining that the normalized binary value may be the normal number, when the exponent of the normalized binary value is not included in the dynamic range of the normal number and is included in a dynamic range of the subnormal number, determining that the normalized binary value may be the subnormal number, and when the exponent of the normalized binary value is not included in the dynamic range of the normal number and the dynamic range of the subnormal number, determining that the normalized binary value may be the extended normal number.

A dynamic range of the extended normal number may be a range representing a positive number or a negative number having an absolute value greater than an absolute value of a subnormal number that is representable in the n-bit format and having an absolute value less than an absolute value of a normal number that is representable in the n-bit format.

The determining may include, when an exponent of the normalized binary value is included in a dynamic range of the normal number that is representable in the n-bit format, determining that the normalized binary value may be the normal number, when the exponent of the normalized binary value is not included in the dynamic range of the normal number and is included in a dynamic range of the extended normal number, determining that the normalized binary value may be the extended normal number, and when the exponent of the normalized binary value is not included in the dynamic range of the normal number and the dynamic range of the extended normal number, determining that the normalized binary value may be the subnormal number.

A value of n may be 16, the n-bit format may be a half precision floating point format, the n-bit multiplication operation may be a 16-bit multiplication operation using a 16-bit multiplier, and in the n-bit format, the sign field may include 1 bit, the exponent field may include 5 bits, and the significand field may include 10 bits.

The extended normal number may be a positive number between $2^{-25} \times (1+1023/1024)$ and $2^{-56} \times (1+0/1024)$, or a negative number between $(-1) \times 2^{-56} \times (1+1023/1024)$ and $(-1) \times 2^{-25} \times (1+0/1024)$.

The normalizing may include performing an addition operation on the exponent field of the first floating point operand and the exponent field of the second floating point operand, performing a subtraction operation by subtracting a bias corresponding to the n-bit format from a result of the addition operation, performing a multiplication operation on the significand field of the first floating point operand and the significand field of the second floating point operand, and normalizing a binary value obtained based on a result of the subtraction operation and a result of the multiplication operation.

The n-bit multiplication operation may correspond to part of a multiply-and-accumulate (MAC) operation of a neural network, and the encoded binary value may be provided for an accumulation operation with a third floating point operand of m bits, wherein m may be a natural number greater than n.

In another general aspect, a non-transitory computer-readable storage medium stores instructions that, when executed by one or more processors, cause the one or more processors to perform the method described above.

In another general aspect, an apparatus includes one or more processors configured to receive a first floating point operand and a second floating point operand, each having an n-bit format including a sign field, an exponent field, and a significand field, wherein n is a natural number, normalize a binary value obtained by performing arithmetic operations for fields corresponding to each other in the first and second floating point operands for an n-bit multiplication operation, determine whether the normalized binary value is a number that is representable in the n-bit format or an extended normal number that is not representable in the n-bit format, according to a result of the determination, encode the normalized binary value using an extension bit format in which an extension pin for identifying whether the normalized binary value is the extended normal number is added to the n-bit format, and output the encoded binary value using the extended bit format as a result of the n-bit multiplication operation between the first and second floating point operands.

The apparatus may further include a memory storing instructions, which, when executed by the one or more processors, configure the one or more processors to perform the normalization, the determination, the encoding, and the output of the encoded binary value.

The number that is representable in the n-bit format may be a normal number or a subnormal number, and the extended normal number may not be included in a dynamic range of the normal number and may not be included in a dynamic range of the subnormal number.

The one or more processors may be further configured to determine whether the normalized binary value is the normal number, the subnormal number, or the extended normal number, based on an exponent of the normalized binary value.

An arithmetic operation may be a convolution operation.

The extension pin may have a first value when the normalized binary value is a normal number or a subnormal number that is representable in the n-bit format, and may have a second value when the normalized binary value is the extended normal number.

A dynamic range of the extended normal number may be a range representing a positive number or a negative number having an absolute value smaller than an absolute value of a subnormal number that is representable in the n-bit format.

A dynamic range of the extended normal number may be a range representing a positive number or a negative number having an absolute value greater than an absolute value of a subnormal number that is representable in the n-bit format and that is smaller than an absolute value of a normal number that is representable in the n-bit format.

A value of n may be 16, the n-bit format may be a half precision floating point format, the n-bit multiplication operation may be a 16-bit multiplication operation using a 16-bit multiplier, in the n-bit format, the sign field may include 1 bit, the exponent field may include 5 bits, and the significand field may include 10 bits, and the extended normal number may be a positive number between $2^{-25} \times (1+1023/1024)$ and $2^{-56} \times (1+0/1024)$, or a negative number between $(-1) \times 2^{-56} \times (1+1023/1024)$ and $(-1) \times 2^{-25} \times (1+0/1024)$.

The one or more processors may each include a multiply-and-accumulate (MAC) operator configured to perform a MAC operation, wherein the MAC operator may include an n-bit multiplier that performs the n-bit multiplication operation and an m-bit accumulator, wherein m may be a natural number greater than n, wherein the n-bit multiplier may include an adder configured to perform an addition operation on the exponent field of the first floating point operand and the exponent field of the second floating point operand, a subtractor configured to perform a subtraction operation of subtracting a bias corresponding to the n-bit format from a result of the addition operation, a multiplier configured to perform a multiplication operation on the significand field of the first floating point operand and the significand field of the second floating point operand, and a normalizer configured to normalize the binary value obtained based on a result of the subtraction operation and the result of the multiplication operation, and wherein the MAC operator may be configured to perform an accumulation operation on the encoded binary value and a third floating point operand of m bits using the accumulator.

In another general aspect, a processor-implemented method includes normalizing a binary value obtained by performing arithmetic operations for fields corresponding to each other in first and second floating point operands for an n-bit multiplication operation, wherein the n-bit multiplication operation corresponds to part of a multiply-and-accumulate (MAC) operation of a neural network, encoding the normalized binary value using an extension bit format in which an extension pin for identifying whether the normalized binary value is the extended normal number is added to an n-bit format, based on determining whether the normalized binary value is a number that is representable in the n-bit format or an extended normal number that is not representable in the n-bit format, and outputting the encoded binary value using the extended bit format, as a result of the n-bit multiplication operation between the first and second floating point operands for use in a neural network.

The number that is representable in the n-bit format may be a normal number or a subnormal number, and the extended normal number may not be included in a dynamic range of the normal number and may not be included in a dynamic range of the subnormal number.

The extension pin may have a first value when the normalized binary value is a normal number or a subnormal number that is representable in the n-bit format, and may have a second value when the normalized binary value is the extended normal number.

A dynamic range of the extended normal number may be a range representing a positive number or a negative number having an absolute value that is smaller than an absolute value of a subnormal number that is representable in the n-bit format.

The method may further include generating a first floating point operand and a second floating point operand, each having an n-bit format including a sign field, an exponent field, and a significand field, wherein n may be a natural number.

The first floating point operand and the second floating point operand may be generated as an activation output of a previous layer of the neural network.

Other features and aspects will be apparent from the following detailed description, the drawings, and the claims.

BRIEF DESCRIPTION OF THE DRAWINGS

FIG. 5 is a diagram illustrating a format of a half precision floating point (FP16) defined in the Institute of Electrical and Electronics Engineers (IEEE) 754 standard and a decoding table.

FIG. 12 is a diagram illustrating an extended bit format method, according to one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
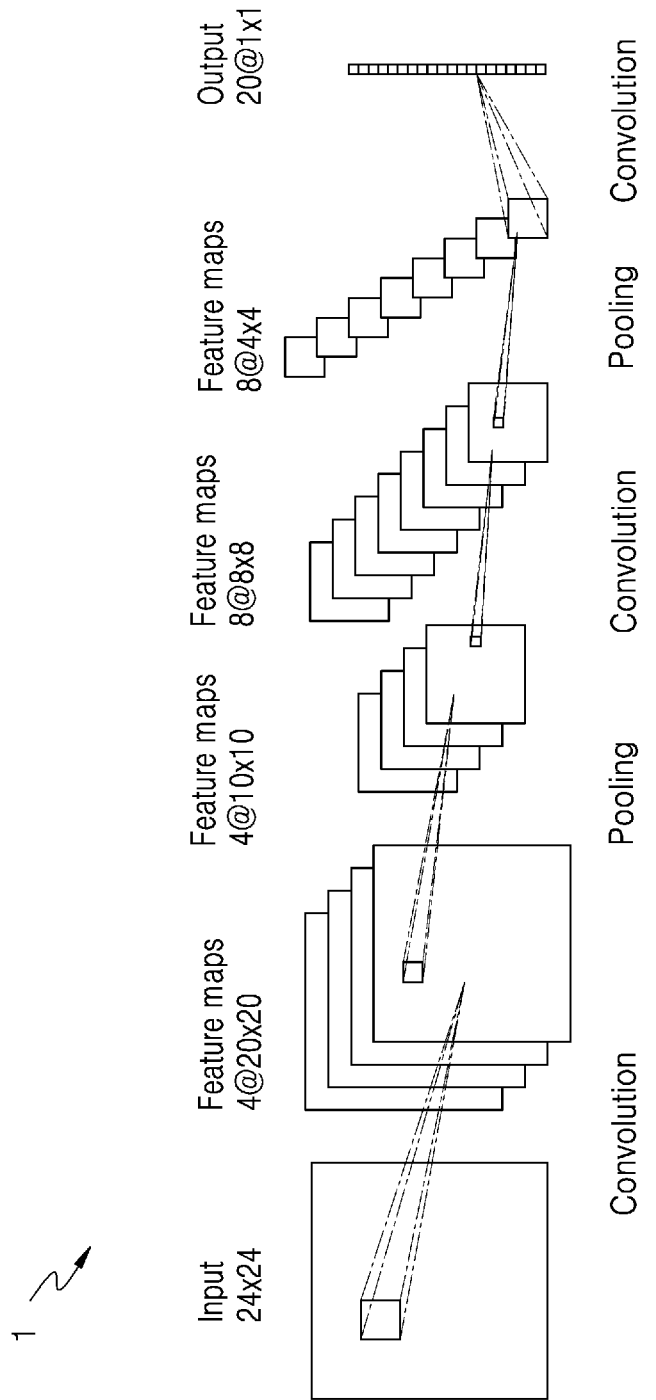
FIG. 1 is a diagram illustrating an architecture of a neural network, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Terms such as "including" or "comprising" used in the embodiments should not be construed as necessarily including all of various components, or various operations described in the specification, and it should be construed that some of the components or some of the operations may not be included or may further include additional components or operations. The use of the term "may" herein with respect to an example or embodiment (e.g., as to what an example or embodiment may include or implement) means that at least one example or embodiment exists where such a feature is included or implemented, while all examples are not limited thereto.

Hereinafter, the present disclosure will now be described more fully with reference to the accompanying drawings. The disclosure may, however, be embodied in many different forms and should not be construed as being limited to the embodiments set forth herein.

FIG. 1 is a diagram illustrating an architecture of a neural network, according to one or more embodiments.

Referring to FIG. 1, the neural network 1 may have an architecture of a deep neural network (DNN) or an n-layer neural network. The DNN or the n-layer neural network may correspond to one of a convolutional neural network (CNN), a recurrent neural network (RNN), a deep belief network, a restricted Boltzmann machine, and so on, as non-limiting examples. For example, the neural network 1 may be implemented as a CNN, but the type of the neural network 1 is not limited to being a CNN.

The neural network 1 may be implemented as a computing architecture having multiple layers, with respect to an input image. In the neural network 1, a convolution operation with a filter called a weight kernel may be performed on the input image. As a result, an output feature map may be generated. At this time, the generated output feature map may be used as input feature maps of a next layer. Convolution operations with respective kernels may be performed on respective output feature maps of the different convolutional layers generating corresponding new output feature maps. As a result of performing the convolution operations, a result of recognizing the characteristics of the input image through the neural network 1 may be output as a final result.

For example, when an image having a size of 24×24 pixels is input to the neural network 1 of FIG. 1, the input image may be output as four channel feature maps, each having a size of 20×20 pixels, through performing the convolution operation with four kernels. Thereafter, the size of each of the 20×20 feature maps may each be progressively reduced through a repeated convolution operations using respective kernels, and the characteristics of a size of a 1×1 pixel size may be finally output, as a result. In such one or more embodiments, the neural network 1 may filter and output robust characteristics that may represent aspects of the entire image from the input image by performing the multiple convolution operations with corresponding pooling or sub-sampling operations in various layers, and then derive a recognition result with respect to the input image based on the output final characteristics.

Figure 2:
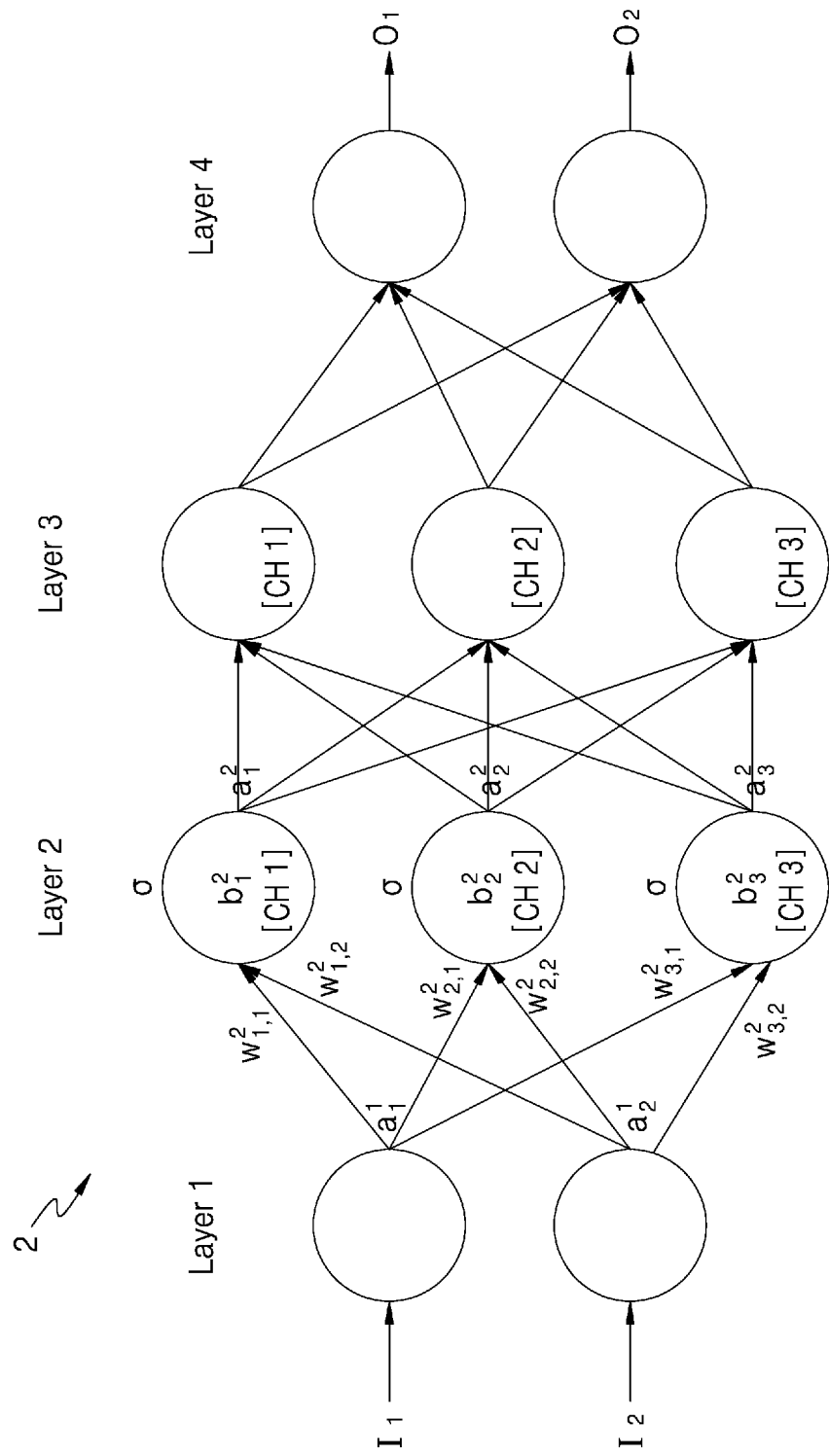
FIG. 2 is a diagram illustrating a neural network, according to one or more embodiments.

FIG. 2 is a diagram illustrating an operation performed in a neural network, according to one or more embodiments.

Referring to FIG. 2, the neural network 2 may have a structure including an input layer, one or more hidden layers, and an output layer. The neural network 2 may perform an operation based on received input data, for example, $I_1$ and $I_2$, and may generate output data, for example, $O_1$ and $O_2$, based on a result of performing the operation.

In one or more embodiments, the neural network 2 may be a DNN or an n-layer neural network including two or more hidden layers, as described above. For example, as shown in FIG. 2, the neural network 2 may be a DNN including an input layer (Layer 1), two hidden layers (Layer 2 and Layer 3), and an output layer (Layer 4). The neural network 2 may process more complex data sets than a neural network having a single layer because the neural network 2 may include more layers capable of processing information when implemented as a DNN architecture. Moreover, the neural network 2 is shown in FIG. 2 as including four layers, but FIG. 2 is only a non-limiting example, and the neural network 2 is also representative of a neural network with fewer or more layers than 4, and may also include fewer or more channels than the channels shown in the one or more embodiments of FIG. 2, each having one or more artificial nodes. Therefore, the neural network 2 may include layers of various sorts.

Each of the layers included in the neural network 2 may include a plurality of channels (e.g., each representative of one or more nodes, also referred to as respective artificial neurons, processing elements (PE), or units. As illustrated in FIG. 2, for example, the input layer Layer 1 may include two channels (nodes), which interact with the hidden layer Layer 2, and the hidden layer Layer 3, each of which may include three channels (nodes). However, this is only a non-limiting example, and each of the layers of the neural network 2 may include various numbers of channels (and respective one or more nodes), in one or more embodiments.

The channels (nodes) included in each of the layers of the neural network 2 may be connected to other channels (nodes), all of which are able to process data. For example, any one channel (node) may receive data from other channels or nodes, such as channels (nodes) in a previous layer, to calculate the data, and output a result of such computations to channels (nodes) of a next layer.

An input and an output of each of the channels (nodes) may be referred to as input activation and output activation, respectively, for a given channel (node). That is, the output activation may be an output of one channel (node), and simultaneously a parameter that acts as an input activation corresponding to the one or more channels (nodes) included in the next layer. Moreover, each of the channels (nodes) may determine and output its activation output, based on input activations received from the channels (nodes) included in the previous layer and connection weights. Each weight is a parameter used to calculate an output activation in each channel (node), along with the corresponding input activation, and may be a value assigned to a connection relationship between the channels (or respective nodes).

Each of the channels (or each node or plural nodes represented by each illustrated channel of a layer) may be processed by a computational unit or a processing element that receives input and outputs output activation. Such a computational unit or a processing element may be implemented in a variety of ways by one or more hardware processors or one or more hardware computers. The input-output of each of the channels (nodes) may be mapped appropriately by such processors. For example, when σ denotes an activation function, $w_{jk}^{i}$ denotes a weight between a k-th channel (or node) included in an i−1th layer and a j-th channel (or node) included in an i-th layer, $b_j^i$ denotes a bias of a j-th channel included in the i−1th layer, and $a_j^i$ denotes an activation of the j-th channel (or node) included in the i-th layer, the activation $a_j^i$ may be calculated as shown in Equation 1 below.

$$a_j^i = \sigma\left(\sum_k (w_{jk}^j \times a_k^{i-1}) + b_j^i\right) \quad \text{Equation 1}$$

As illustrated in the one or more embodiments of FIG. 2, an activation of a first channel CH1 (or first node) of the hidden layer Layer 2 may be represented as $a_1^2$. Also, $a_1^2$ may have a value of $a_1^2 = \sigma(w_{1,1}^2 \times a_1^1 + w_{1,2}^2 \times a_1^2 + b_1^2)$, according to Equation 1. However, Equation 1 is only a non-limiting example for calculating the activations and application of the weights used for processing data in the neural network 2, but Equations for activations are not limited to Equation 1. The activation may refer to a value, obtained by passing a value to which an activation function is applied, to a sum of the activations (e.g. through respective weighted connections) received from the previous layer to a rectified linear unit (ReLU).

As described above, in the neural network 2, a large number of data sets are exchanged between a plurality of interconnected channels (or nodes), and are subjected to a number of operations incrementally through multiple layers. In such an example, because the data may correspond to floating point values of various precisions, the neural network 2 may advantageously implement a technology capable of minimizing the loss of accuracy while also reducing the amount of computations implemented for processing complex input data such as floating point values.

Figure 3:
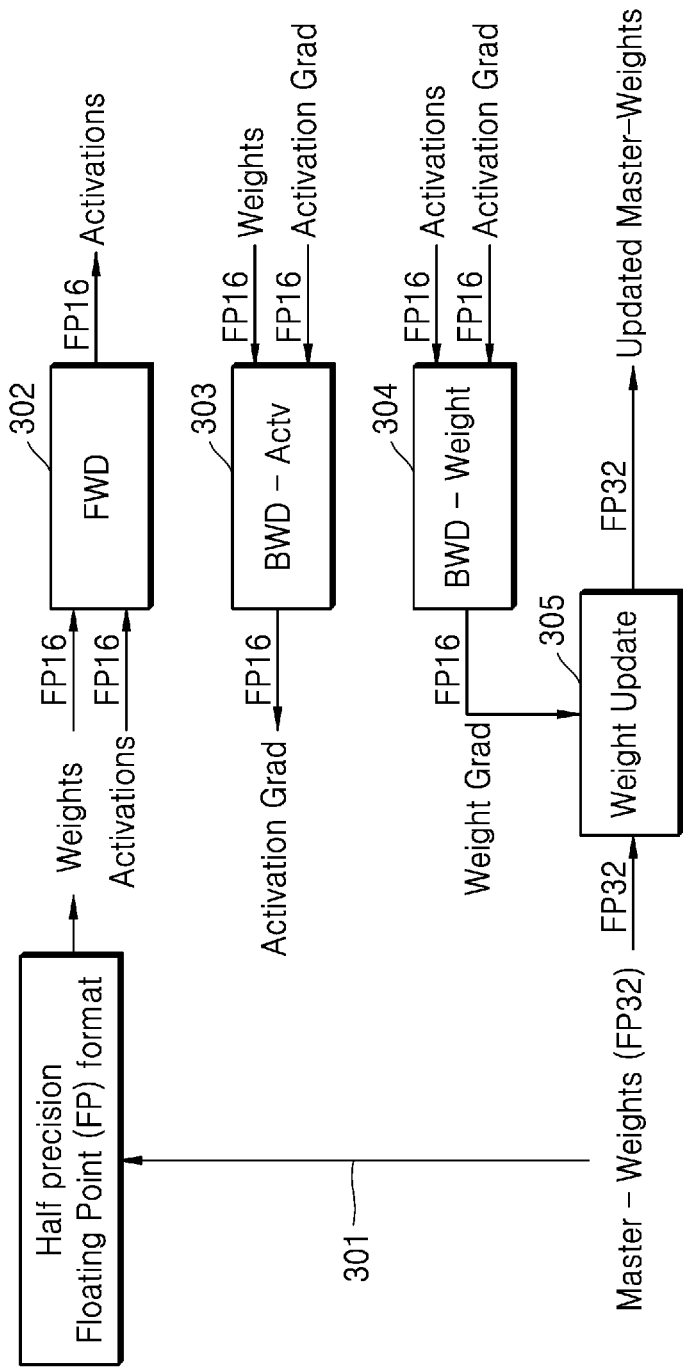
FIG. 3 is a diagram for illustrating performing training in a neural network using a mixed precision, according to one or more embodiments.

FIG. 3 is a diagram for illustrating performing training in a neural network using a mixed precision, according to an example.

Referring to FIG. 3, the neural network, for example, neural network 1 of FIG. 1, or neural network 2 of FIG. 2, as non-limiting examples, may perform feedforward propagation (FWD) 302 while backward propagations (BWD) 303 and 304 for neural network training. Here, while the FWD 302 is referred to in the context of forward propagation (whether feedforward, recurrent, bi-directional, convolutional, pooling, etc.), e.g., compared to backward propagation of errors on layers of the BWD 302/324 operations, in training of the neural network, e.g., with respect to training input data, the FWD 302 is also applicable to (and representative of) inference operation embodiments where such forward propagation is similarly preferred for non-training data, for example.

The FWD 302 may be a process that performs convolution operations between input activations and corresponding weights. Through the FWD 302, an output activation of each layer may be obtained, and finally an output of the neural network may be obtained. The input activations and corresponding weights for the FWD 302 may be in the format of half precision floating point (FP), and the output activation of each layer may also be in the format of the half precision FP. The half precision FP may correspond to a format of a 16-bit floating point value (FP16).

The neural network may support the mixed precision. For example, while the convolution operation between activation (FP16) and weight (FP16) may be performed during the FWD 302, intermediate arithmetic results of the convolution operation may be obtained in the format of the floating point of a different precision, for example, single precision (FP32). The final output activation may be output in the format of FP16, as described in greater detail, above.

A loss function may then be generated by a comparison between the output and an expectation value. The BWD 303 and 304 may perform training for minimizing the loss of the loss function, accordingly.

BWD for activation (BWD-Actv) 303 may be a process of propagating an FP16 activation gradient and an FP16 weight calculated based on the loss function. BWD for weight (BWD-Weight) 304 may be a process of propagating an FP16 activation gradient Activation Grad and an FP16 activation calculated based on the loss function. As a result of performing the BWD 303 and 304, the FP16 activation gradient Activation Grad and the FP16 weight gradient Weight Grad may be output.

The FP16 weight gradient Weight Grad output by the BWD-Weight 304 may be used for a weight update 305 with respect to each layer of the neural network. The weight update 305 may be a process of updating respective master-weights, e.g. respectively corresponding to the weights applied in the FWD 302, based on the FP16 weight gradient Weight Grad output by the BWD-Weight 304. In such an example, both the master-weights and the updated master-weights may correspond to parameters in the FP32 format.

A FP32 master-weight may be quantized in operation 301 into the FP16 format and provided to each layer.

Alternatively put, forward propagation and backward propagation processes performed in the training of the neural network may be performed by operations of parameters having mixed precisions. When a precision is high, the accuracy of the neural network may further increase, but the amount of computations and the amount of processing time for processing the neural network may increase. By contrast, when precisions are low, the accuracy of the neural network may be further reduced, but the amount of computations and the amount of processing time for processing the neural network may be reduced, accordingly. Therefore, a neural network that supports mixed precisions may enable efficient computation processing while also helping to guarantee a certain level of accuracy.

Moreover, in FIG. 3, the format using mixed precisions of FP16 and FP32 is used as a non-limiting example for convenience of explanation, but the examples also exist that support using formats of mixed precision with other precision values.

Figure 4:
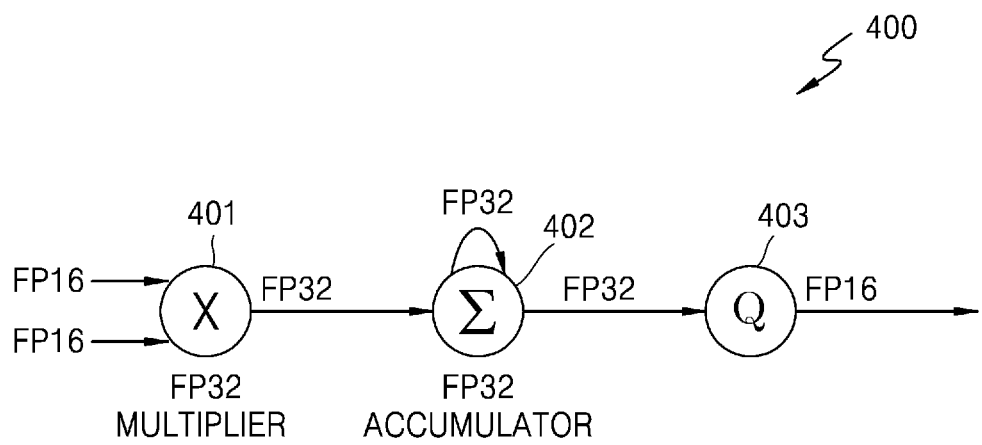
FIG. 4 is a diagram illustrating a multiply-and-accumulate (MAC) operation using a mixed precision, according to one or more embodiments.

FIG. 4 is a diagram illustrating a multiply-and-accumulate (MAC) operation 400 using a mixed precision, according to one or more embodiments.

Referring to FIG. 4, in each layer of a neural network, the MAC operation 400 may be performed so as to perform a respective convolution between corresponding input activations and weights. In such an example, the MAC operation 400 may be an operation that supports mixed precision. The MAC operation 400 may support, for example, a format of mixed precision of FP16 and FP32.

Specifically, the MAC operation 400 may include an FP multiplication operation 401, an FP accumulation operation 402, and a quantization operation 403, in a non-limiting example. The FP multiplication operation 401 may be a multiplication operation between an FP16 input activation and an FP16 weight. The FP multiplication operation 401 may be performed by an FP32 multiplier. Then, a multiplication result may be output from the FP32 multiplier in the format of FP32. The FP accumulation operation 402 may be performed on multiplication results in the format of FP32 using an FP32 accumulator, and an accumulation result may be output in the format of FP32. The accumulation result in the format of FP32 is then quantized into the format of FP16 through the quantization operation 403, and such a quantization result may correspond to an example output activation, e.g., of multiple output activations, of the corresponding layer.

As described above, the MAC operation 400 that supports mixed precision, such as, for example, FP16 and FP32, may be processed using the FP32 multiplier and the FP32 accumulator. In such an example, the FP32 multiplier may correspond to a full precision multiplier with respect to FP16 operands, such as FP16 input activation and FP16 weight. Thus, a multiplication result of the FP16 operands may be obtained without a loss of precision. However, the FP32 multiplier, or a single precision multiplier, may have a larger circuit area and a greater power consumption than the FP16 multiplier, or a half precision multiplier. As a non-limiting example, experimentally, the area of the FP16 multiplier may be reduced to about 37.5% of the area of the FP32 multiplier, and the power consumption of the FP16 multiplier may be reduced to about 61.0% of the power consumption of the FP32 multiplier. However, because the FP16 multiplier may have a lower precision than the FP32 multiplier, the accuracy of the multiplication operation may be lowered accordingly. Therefore, in the implementation of a MAC operator for the MAC operation 400 supporting mixed precision, for example, FP16 and FP32, a solution for achieving the efficiency of the area and power consumption of the MAC operator while also ensuring the accuracy of the MAC operator may be desirable.

FIG. 5 is a diagram for illustrating a format of a half precision floating point (FP16) 510 defined in the Institute of Electrical and Electronics Engineers (IEEE) 754 standard and a corresponding decoding table 520.

Referring to FIG. 5, the format of FP16 510 is a format defined by the IEEE 754 standard and corresponds to a binary bit format for storing 16-bit floating point in a memory. In FIG. 5, according to the format of FP16 510, 1 bit [15] corresponds to a sign field, 5 bits [14:10] correspond to an exponent field, and 10 bits [9:0] correspond to a significand field (or a fraction field). For example, when a floating point value is represented in the form of "a×2$^b$," the sign of "a" may correspond to the sign field, the absolute value of "a" may correspond to a significand, and "b" may correspond to an exponent. In such an example, "a" may refer to valid numbers for use in the floating point value.

Numbers representable in the format of FP16 510 can be explained further with respect to the decoding table 520.

According to the decoding table 520, when the exponent of the floating point value is in the range of "00001$_2$~11110$_2$", the floating point value may correspond to a normal number. An expression used to derive the normal number may be $$(-1)^{signbit} \times 2^{exponent-15} \times 1.significantbits_2.$$

When the exponent of the floating point value is 11111$_2$, this floating point value may be understood to correspond to infinity or not a number (NaN), depending on the significand.

When the exponent of the floating point value is 00000$_2$ and the significand is 0, the floating point value may correspond to 0. However, when the exponent of the floating point value is 00000$_2$ and the significand is not 0, the floating point value may corresponds to a subnormal number, also referred to as a denormal number. An expression representing the subnormal number may be $(-1)^{signbit} \times 2^{-14} \times 0.significantbits_2$.

Accordingly, according to the decoding table 520, the maximum and minimum values of positive normal numbers and the maximum and minimum values of positive subnormal numbers representable in the format of FP16 510 are as follows.

A maximum value of positive normal numbers can be represented as: 0 11110 1111111111$_2$=2$^{15}$×(1+1023/1024)=65504

A Minimum value of positive normal numbers can be represented as: 0 00001 0000000000$_2$=2$^{-14}$×(1+0/1024)≈0.000061035

A Maximum value of positive subnormal numbers can be represented as: 0 00000 1111111111$_2$=2$^{-14}$×(0+1023/1024)≈0.000060976

A Minimum value of positive subnormal numbers can be represented as: 0 00000 0000000001$_2$=2$^{-14}$×(0+1/1024)≈0.000000059605

Figure 6:
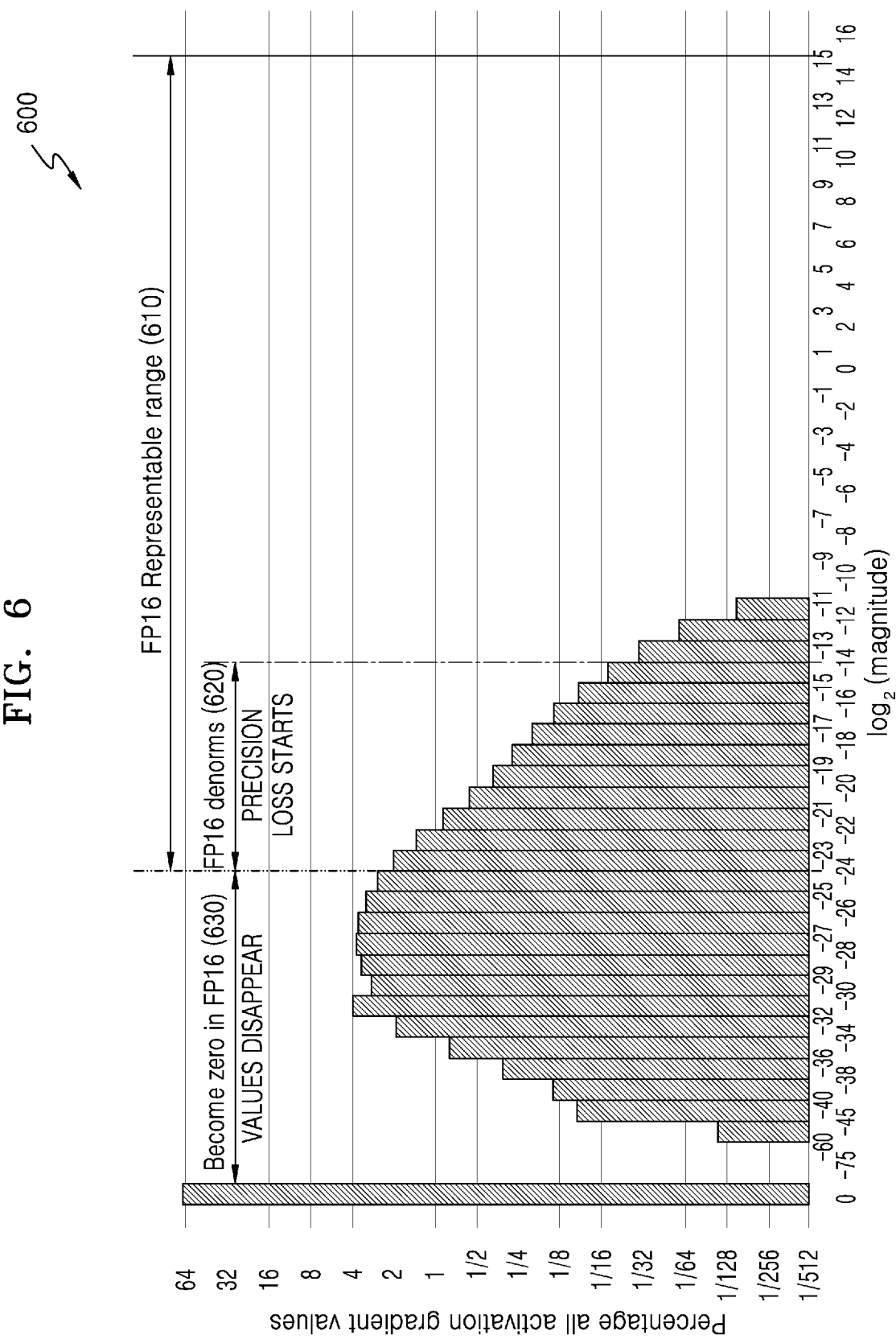
FIG. 6 is a diagram illustrating a histogram of an activation gradient, according to one or more embodiments.

FIG. 6 is a diagram for illustrating a histogram 600 of an activation gradient, according to one or more embodiments.

Referring to the one or more embodiments of FIG. 6, the histogram 600 illustrates activation gradient magnitudes, shown using a scale of log$_2$ (magnitude), obtained during FP32 training of a MultiBox SSD network, such as a Single Shot MultiBox Detector (SSD).

Referring to the histogram 600, among the activation gradient magnitudes, a magnitude of 0 is distributed at about 64%.

According to the decoding table 520 described above with reference to FIG. 5, of the FP 16 representative range 610, the dynamic range of positive normal numbers representable in the format of FP16 510 is 2$^{-14}$ to 2$^{15}$, while the dynamic range of positive subnormal numbers representable in the format of FP16 510 is 2$^{-24}$ to 2$^{-15}$.

Thus, when the activation gradient magnitudes obtained during FP32 training are converted into FP16, all FP32 floating point values, about 31%, included in a dynamic range 630 (about 31% of IP32 floating point values) may be converted into a value of 0. Such a conversion may take place because the FP32 floating point values included in the dynamic range 630 portion of FIG. 6 are not representable in the format of FP16 510, and hence may simply be truncated to have a value of 0.

Hereinafter, a low-precision FP multiplier, for example, an FP multiplier using FP16, representable with respect to floating point values that are not representable at low precision, such above example FP32 floating point values included in the dynamic range 630, will be described below in greater detail, according to one or more embodiments.

Figure 7:
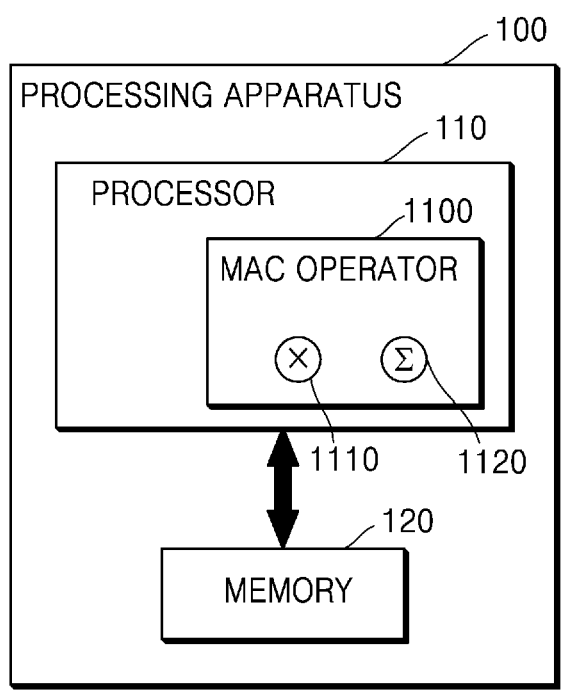
FIG. 7 is a block diagram illustrating a processing apparatus, according to one or more embodiments.

FIG. 7 is a block diagram illustrating a hardware configuration of a processing apparatus 100, according to one or more embodiments.

Referring to FIG. 7, the processing apparatus 100 may include at least one processor 110 and at least one memory 120. In the processing apparatus 100 illustrated in FIG. 7, only some components of one or more embodiments are shown, while in other embodiments, the processing apparatus 100 may further include other general purpose components in addition to or in lieu of the non-limiting components of FIG. 7.

The processing apparatus 100 may correspond to a computing device used for implementing a neural network, such as by performing above example operations of the neural network. For example, the processing apparatus 100 may be a personal computer (PC), a server device, a mobile device, or the like, or may instead correspond to an accelerator, such as a hardware accelerator, configured to perform a neural network operation in such devices. Furthermore, the processing apparatus 100 may be, or be provided in the context of, larger systems such as autonomous vehicles, robotics, smartphones, tablet devices, augmented reality (AR) devices, Internet of things (IoT) devices, and so on, and perform voice recognition and/or image recognition using one or more neural networks. However, the processing apparatus 100 is not limited to these specific examples, and may correspond to various kinds of other devices or various types of a processing apparatus, as non-limiting examples, performing the neural network operation in such devices.

The processor 110 may be hardware configured to perform overall control functions for controlling operations of the processing apparatus 100. For example, the processor 110 may generally control the processing apparatus 100 by processing or executing instructions and/or data stored in the memory 120 of the processing apparatus 100. Such a processor 110 may be implemented as a central processing unit (CPU), a graphics processing unit (GPU), an application processor (AP), a neural processing unit (NPU), a tensor processing unit (TPU), or the like, provided in the processing apparatus 100, but is not limited to these enumerated embodiments, and the processor 110 may be implemented with other types of processors in other embodiments. Also, the processor 110 is not limited to being a single processor, but may also implemented using multiple processors, or a multicore processor.

The memory 120 may be hardware that stores various kinds of neural network data and/or parameters to be processed or processed in the processor 110. For example, the memory 120 may store input/output feature map data, convolution data, and other similar data processed in the neural network. In addition, the memory 120 may store various applications to be driven by the processor 110. As another example, the memory 120 may store instructions, which when executed by the processor 1120, configure the processor 110 to perform one or more or all operations or methods described herein.

The memory 120 may correspond to one or more memory devices such as random access memory (RAM), read only memory (ROM), hard disk drive (HDD), solid state drive (SSD), compact flash (CF), secure digital (SD), micro secure digital (micro-SD), mini secure digital (Mini-SD), extreme digital (xD), memory stick, and so on, and the type of the memory 120 may be various types of memory without being limited to these enumerated examples.

The processor 110 may be implemented as at least one processor core, used for executing inference processes and/or training processes of the neural network as described above. For example, the processor 110 may include an FP multiplier 1110 and an FP accumulator 1120 for processing an MAC operation of a convolution operation. Alternately put, the processor 110 may include logic circuit configurations for executing inference processes and/or a training process using an FP. Additionally, the processor 110 may perform various operations for implementation of the neural network while supporting operations of mixed precision.

The FP multiplier 1110 provided for the MAC operation in the processor 110 may be a half precision floating point (FP16) multiplier. That is, by contrast from the FP32 (high or higher precision) multiplier described in FIG. 5, the FP multiplier 1110 may correspond to a low (or lower) precision, for example, FP16, multiplier. Accordingly, the area of the FP multiplier 1110 occupied in the processor 110 may be reduced and power consumption of the operations may be relatively reduced, compared to an operation performed using a high precision, for example, FP32, multiplier. When the FP multiplier 1110 is implemented as the low precision, for example, FP16, multiplier, an extended bit format that is an FP format, with the addition of an extension pin that is described in greater detail below may be used, thereby preventing the loss of FP32 floating point values included in the dynamic range 630 of FIG. 6, for example.

Moreover, as illustrated in FIG. 7, the FP multiplier 1110 may be integrated to configure a MAC operator 1100, that is, a fused multiply-add operator, together with the FP accumulator 1120 in the processor 110, as a non-limiting example. However, one or more embodiments are not limited thereto, and the FP multiplier 1110 may be implemented so as to correspond to an FP multiplier that is independently provided in the processor 110 separately from the MAC operator 1100. That is, the implementation form of the FP multiplier in the processor 110 may not be limited to any particular examples, and various implementations exist in various embodiments.

With respect to when the FP multiplier 1110 of the processor 110 corresponds to the low precision, for example, FP16, multiplier, a process of performing a multiplication operation of the MAC operation using the FP multiplier 1110 is described in further detail.

The processor 110 may receive a first FP operand and a second FP operand in an n-bit format on which an n-bit, where n is a natural number, multiplication operation is to be performed. In such an example, the FP operands in the n-bit format may include a sign field, an exponent field, and a significand field. In the following description, assuming that n=16 for convenience of description, as a non-limiting example, the n-bit format may be a half precision FP format, the n-bit multiplication operation may be a 16-bit multiplication using a 16-bit multiplier, that is, the FP multiplier 1110, and in the n-bit multiplication operation, the sign field may be 1 bit, the exponent field may be 5 bits, and the significand field may be 10 bits, but embodiments are not limited to this example, and in other examples, n may correspond to a bit number other than 16.

The processor 110 may normalize a binary value obtained by arithmetic operations of fields corresponding to each other in the FP operands for the n-bit multiplication operation. More specifically, the FP multiplier 1110 of the processor 110 may perform an addition operation on the exponent field of a first FP operand and the exponent field of a second FP operand, and may perform a subtraction operation of subtracting a bias, corresponding to the n-bit format, from a result of the addition operation. In such an example, when the FP operands are in the format of FP16, the bias may be $01111_2$=15. Next, the FP multiplier 1110 of the processor 110 may perform a multiplication operation on the significand field of the first FP operand and the significand field of the second FP operand. Based on a result of the subtraction operation and a result of the multiplication operation, the FP multiplier 1110 of the processor 110 may normalize an obtained binary value. Normalization of the binary value refers to a process of converting the significand of the binary value into the form of either $0.\text{significantbits}_2$ or $1.\text{significantbits}_2$, and converting the exponent of the binary value into the power of 2.

The processor 110 may determine whether the normalized binary value is a number representable in the n-bit format or an extended normal number that is not representable in the n-bit format. In such an example, the number representable in the n-bit format may refer to a normal number or a subnormal number. The extended normal number may refer to a number that is not included in a dynamic range of the normal number and a dynamic range of the subnormal number. That is, the extended normal number may be a number corresponding to single precision FPs or FP32 values of the dynamic range 630 of FIG. 6 that are not representable in the format of half precision FP or FP16 values, as defined by the IEEE 754 standard, for example.

The processor 110 may encode the normalized binary value by using an extended bit format in which an extension pin, used for identifying whether the normalized binary value is the extended normal number, is added to the n-bit format, according to a determination result. In other words, the processor 110 may extend the previous FP16 format by using the extension pin, thereby representing the FPs of the dynamic range that are not representable, even in the normal number or subnormal number, when using the previous FP16 format.

The processor 110 may output the binary value encoded by the extended bit format as a result of the n-bit multiplication operation between the FP operands. Subsequently, the processor 110 may perform other operations, such as an accumulation operation, on results of the n-bit multiplication operation, obtained as described above. For example, the result of the n-bit multiplication operation corresponding to the encoded binary value may be provided for the accumulation operation, having a third FP operand of m bits, where m is a natural number greater than n.

As such, the processor 110 may minimize the loss of accuracy of the n-bit multiplication operation, even when the n-bit multiplier is used instead of a 2×n-bit multiplier so as to process the multiplication operation of the n-bit FP operands, and may reduce the area used for the circuit implementation of a multiplier in the processor 110 and may also reduce the power consumption of the multiplier.

Figure 8:
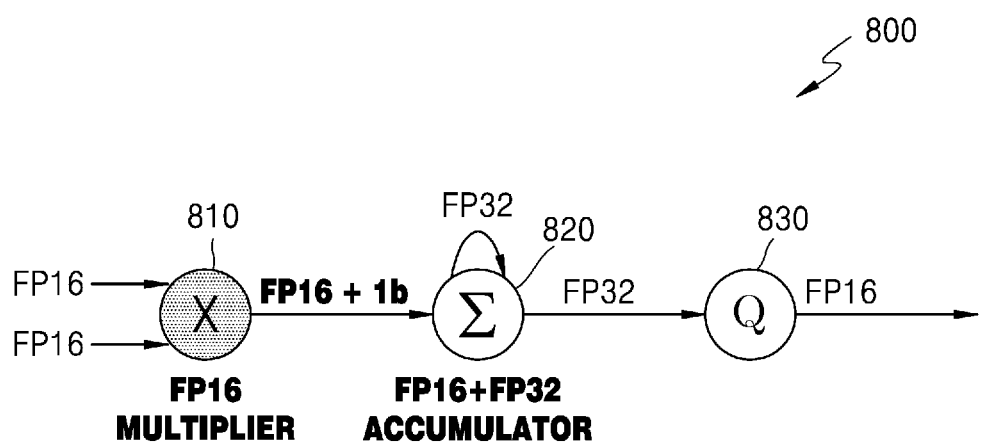
FIG. 8 is a diagram illustrating a MAC operation of mixed precision using a half precision floating point (FP16) multiplier, according to one or more embodiments.

FIG. 8 is a diagram for illustrating performing a MAC operation 800 of mixed precision using a half precision FP (FP16) multiplier, according to an example.

A processor, e.g., the processor 110 of FIG. 7, as a non-limiting example, may include a MAC operator configured to perform a MAC operation of a neural network. The MAC operator may include an n-bit multiplier for performing an n-bit multiplication operation, and an m-bit accumulator. For example, in the one or more embodiments of FIG. 8, n=16 and m is a natural number greater than n.

Referring to FIG. 8, a multiplication operation 810 between an FP16 activation and an FP weight may correspond to a part of the MAC operation 800 to be processed in the neural network. In such one or more examples, the multiplication operation 810 may be performed using the half precision FP or FP16 multiplier, unlike the single precision FP or FP32 multiplier of FIG. 4, for example. As a result of the multiplication operation 810, the FP16 multiplier may output a binary value encoded by the FP16 format including a sign bit (1 bit), exponent bits (5 bits), and significand bits (10 bits) fields, and an extended bit format including a 1-bit expansion pin.

Subsequently, an accumulation operation 820 may be performed on a multiplication result of the extended bit format of FP16+1b with multiplication results of a different FP32 format, at a mixed precision. That is, such an operation may be performed using an m-bit accumulator, assuming m=32, according to one or more embodiments. Accordingly, the accumulation operation 820 of an encoded binary value and an m-bit third FP operand may be performed one or more embodiments.

An accumulation result of the FP32 format may be quantized to an FP16 format through a quantization operation 830. A corresponding quantization result may be propagated to a next layer as an output activation of the corresponding layer.

Figure 9:
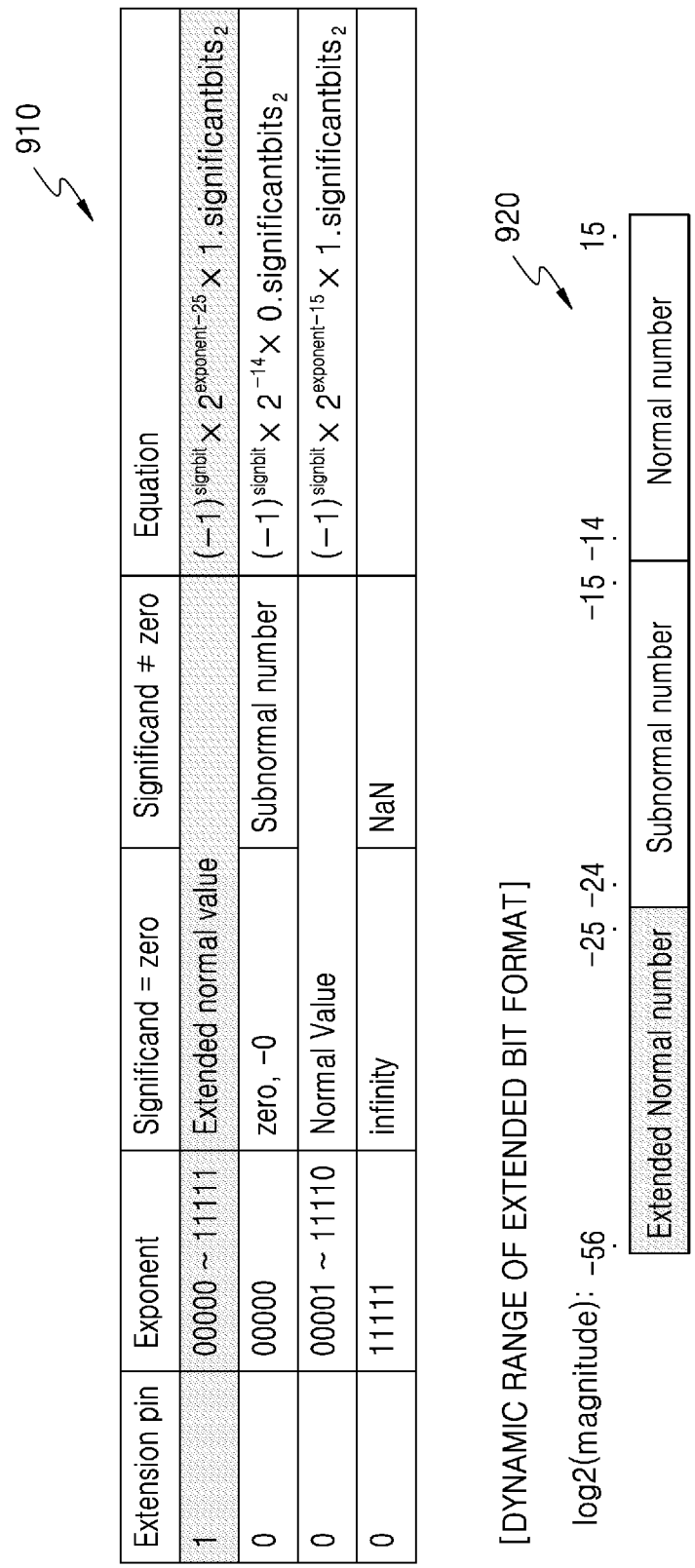
FIG. 9 is a diagram illustrating an extended bit format method, according to one or more embodiments.
Figure 11:
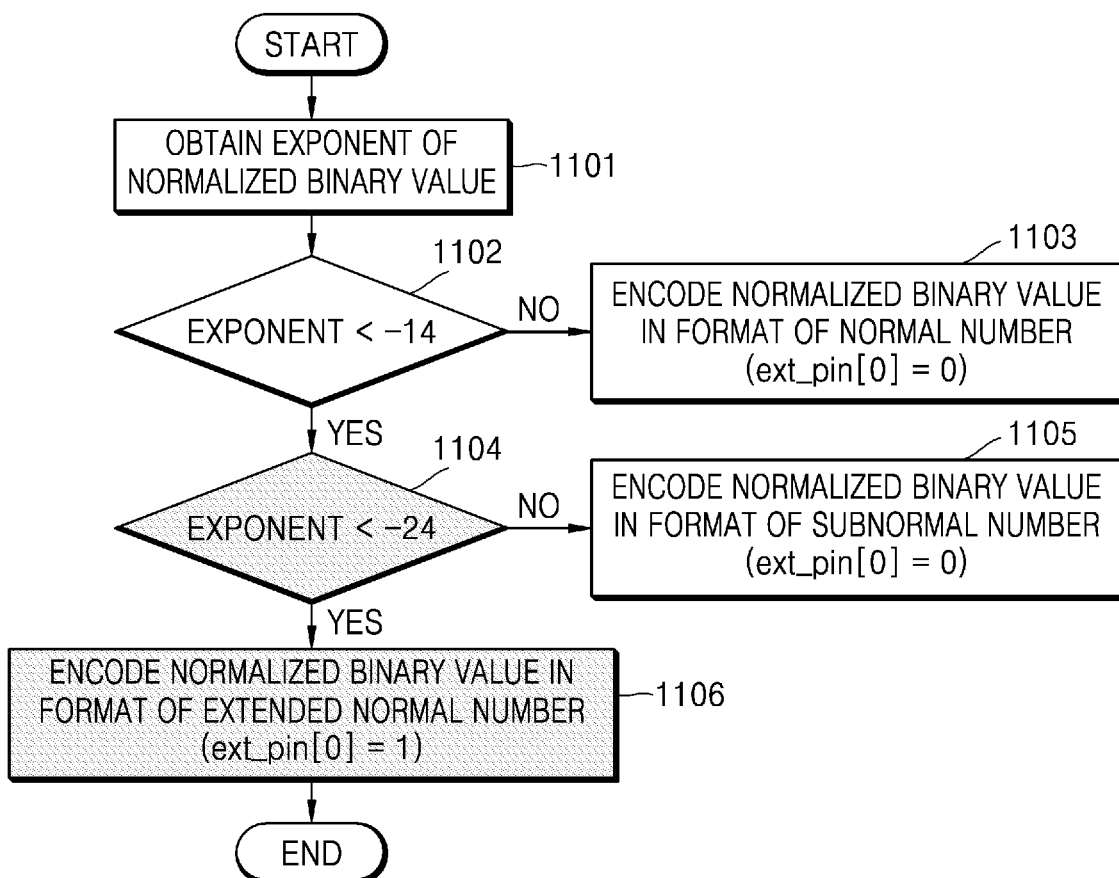
FIG. 11 is a flowchart illustrating an encoding of a result of an FP multiplication operation by using an extended bit format of a method, according to one or more embodiments.
Figure 13:
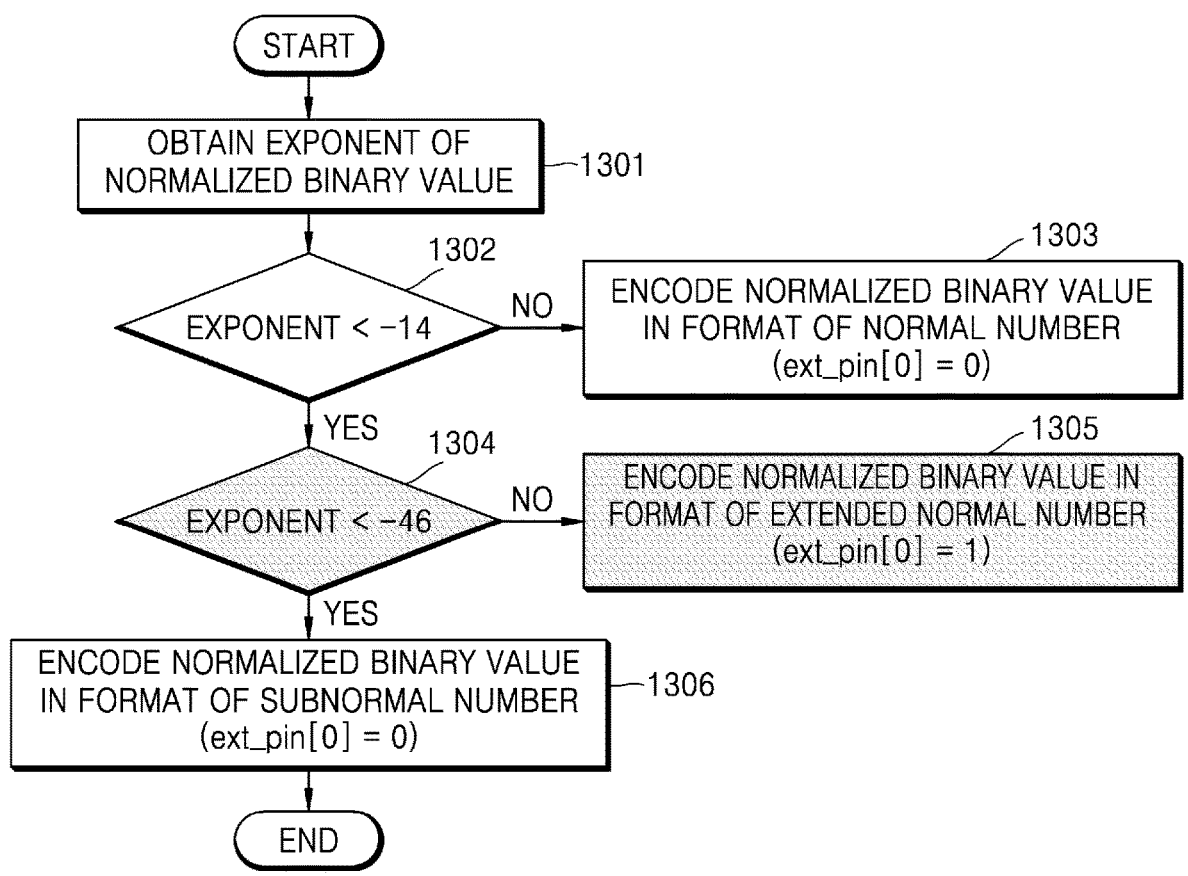
FIG. 13 is a flowchart illustrating an encoding of a result of an FP multiplication operation by using an extended bit format method, according to one or more embodiments.

FIGS. 9 and 11 are detailed diagrams illustrating an extended bit format method, according to one or more embodiments. FIGS. 12 and 13 are detailed diagrams illustrating an extended bit format method, according to one or more embodiments.

FIG. 9 is a diagram for illustrating an extended bit format method, according to one or more embodiments.

Referring to FIG. 9, the extended bit format method may be a format for representing a positive or negative number having an absolute value smaller than an absolute value of a subnormal number representable in an n-bit, for example, n=16, format. That is, an extended normal number according to the extended bit format of the method may correspond to a value smaller than a positive subnormal number, or greater than a negative subnormal number.

Referring to a decoding table 910 according to the extended bit format of the method, when a binary value normalized by an FP16 multiplier is a normal number or a subnormal number representable in the FP16 format, an extension pin may have a value of "0." When the binary value normalized by the FP16 multiplier is an extended normal number, the extension pin may have a value of "1." Alternatively put, the extension pin may be a 1-bit identifier or flag that may distinguish whether the binary value normalized by the FP16 multiplier is the extended normal number.

When the extension pin is "0," a decoding table defining 0, the subnormal number, the normal number, infinity and NaN may be interpreted in a manner similar to that used for the decoding table 520 of FIG. 5, above, for example. However, unlike the decoding table 520, in one or more embodiments the extension pin is "1" and may be added to the decoding table 910, according to this extended bit format method.

An FP value in the case in which the extension pin is "1" may correspond to the extended normal number, and may correspond to a range of values smaller than the subnormal number or larger than the negative subnormal number. An expression representing the extended normal number may be $(-1)^{signbit} \times 2^{exponent-25} \times 1.significantbits_2$. Thus, the extended normal number may be a positive number between $2^{-25} \times (1+1023/1024)$ and $2^{-56} \times (1+0/1024)$, or also a negative number between $(-1) \times 2^{-56} \times (1+1023/1024)$ and $(-1) \times 2^{-25} \times (1+0/1024)$.

A dynamic range 920 of this extended bit format method may be a dynamic range of positive normal numbers from $2^{-14}$ to $2^{15}$, a dynamic range of positive subnormal numbers from $2^{-24}$ to $2^{-15}$, and a dynamic range of positive extended normal numbers from $2^{-56}$ to $2^{-25}$. That is, the extended bit format, which may be an extended FP16 format, may represent FP values between the minimum value of positive subnormal numbers and the maximum value of negative subnormal numbers by adding the extension pin of 1 bit. Accordingly, even though an FP multiplication operation of half precision FP or FP16 operands in the MAC operation may be performed by the FP16 multiplier, the accuracy loss may still be minimized relative to full precision approaches, and the more efficient FP multiplier 1110 may be used in the processor 110 of FIG. 7, for example.

Figure 10:
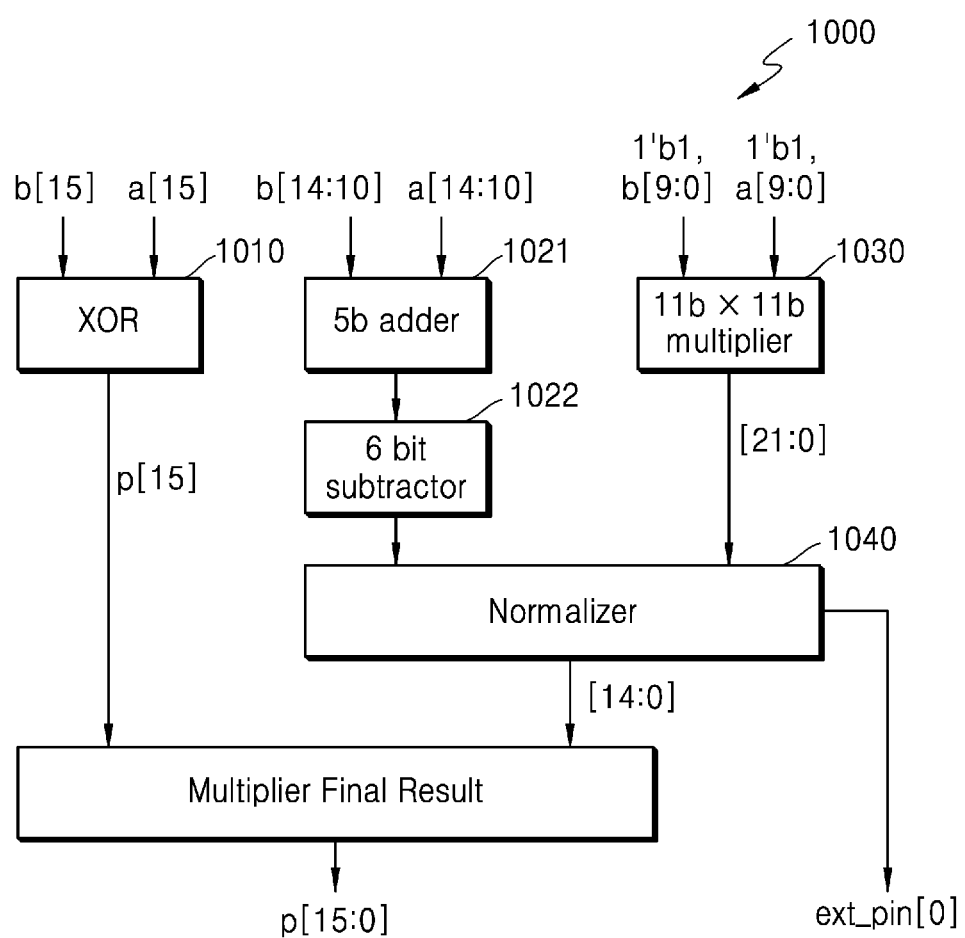
FIG. 10 is a diagram illustrating an FP multiplier, according to one or more embodiments.

FIG. 10 is a diagram for illustrating an architecture of an FP multiplier 1000, according to one or more embodiments.

Referring to FIG. 10, the FP multiplier 1000 may be an FP16 multiplier provided in a processor, such as the processor 110, such as of FIG. 7, to perform a multiplication operation of half precision FP or FP16 operands. For example, the multiplication operator may be with the extended bit format method of FIG. 9. The FP multiplier 1000 may include an XOR logic circuit 1010, an adder 1021, a subtractor 1022, a multiplier 1030, and a normalizer 1040, in a non-limiting example.

The FP multiplier 1000 may receive a first FP operand and a second FP operand in the FP16 format. The FP multiplier 1000 may perform arithmetic operations on fields, corresponding to each other, in the first and second FP operands for a 16-bit multiplication operation.

Specifically, in an example, the XOR logic circuit 1010 may perform an XOR operation between a sign field a[15] of the first FP operand and a sign field b[15] of the second FP operand. The adder 1021 may perform a 5-bit addition operation between an exponent field a[14:10] of the first FP operand and a sign field b[14:10] of the second FP operand. The subtractor 1022 may perform a subtraction operation of subtracting a bias $01111_2$, which is 15 in decimal form, corresponding to the FP16 format from a result of the 5-bit addition operation.

Additionally, the multiplier 1030 may perform an 11-bit multiplication operation between a significand field a[9:0] of the first FP operand and a significand field b[9:0] of the second FP operand. In such examples, because a significand of the FP operands may be represented as $1.significantbits_2$, 1 bit of a value "1" may be added to correspond to the total of 11 bits, for example.

The normalizer 1040 may normalize a binary value, which may be obtained based on a result of the subtraction operation performed by the subtractor 1022 and a result of the multiplication operation by the multiplier 1030. The normalizer 1040 may determine whether the normalized binary value is an extended normal number, and may output an extension pin, ext_pin[0], identifying whether the normalized binary value is the extended normal number. In this respect, the processor 110 may determine whether the normalized binary value is a normal number, a subnormal number, or an extended normal number, decided based on an exponent of the normalized binary value.

The binary value normalized by the normalizer 1040 may be encoded by using an extended bit format, including the extension pin extpin[0] and the FP16 format, and the extension pin_ext_pin [0] and the encoded binary value p[15:0] may output according to a result of the FP16 multiplication operation between the first and second FP operands.

FIG. 11 is a flowchart for illustrating a method of encoding a result of an FP multiplication operation by using an extended bit format method, according to one or more embodiments. For example, the extended bit format method may correspond to the extended bit format method of FIGS. 9 and/or 10.

Referring to FIG. 11, in operation 1101, the FP multiplier 1110, such as that of the one or more embodiments of FIG. 7, that is, corresponding to an FP16 multiplier, e.g., included in the processor 110, may obtain an exponent of a binary value normalized by the normalizer 1040, such as that of FIG. 10, while performing a multiplication operation between a first FP operand and a second FP operand in an FP 16 format, noting that while references are made to example components of FIGS. 7 and 10, examples are not limited thereto.

In operation 1102, the processor 110 may determine whether the exponent of the normalized binary value satisfies the condition of a dynamic range of "exponent<−14." That is, when the exponent of the normalized binary value is included in a dynamic range of normal numbers representable in the FP16 format, the processor 110 may determine that the normalized binary value is the normal number. Accordingly, when the exponent is greater than or equal to −14, the processor 110 may perform operation 1103. However, when the exponent is smaller than −14, the processor 110 may perform operation 1104.

In operation 1103, when the exponent is greater than or equal to −14, the processor 110 may encode the normalized binary value into the extended bit format corresponding to the normal number. At this time, in the extended bit format, an extension pin may have a value of "0," so ext_pin[0]=0.

In operation 1104, the processor 110 may determine whether the exponent satisfies the condition of a dynamic range of "exponent<−24." That is, the processor 110 may determine that the normalized binary value is a subnormal number when the exponent is not included in the dynamic range of normal numbers but included in the dynamic range of subnormal numbers. Accordingly, when the exponent is greater than or equal to −24, the processor 110 may perform operation 1105. However, when the exponent is smaller than −24, the processor 110 may perform operation 1106.

In operation 1105, when the exponent is greater than or equal to −24, the processor 110 may encode the normalized binary value into the extended bit format corresponding to the subnormal number. At this time, in the extended bit format, the extension pin may have a value of "0," so extpin[0]=0.

In operation 1106, when the exponent is smaller than −24, the processor 110 may determine that the normalized binary value corresponds to the extended normal number. Alternatively put, the processor 110 may determine that the normalized binary value is the extended normal number, when the exponent is not included in the dynamic range of normal numbers and the dynamic range of subnormal numbers. Accordingly, the processor 110 may encode the normalized binary value in the extended bit format, corresponding to the extended normal number. At this time, in the extended bit format, the extension pin may have a value of "1," so ext_pin[0]=1.

FIG. 12 is a diagram for illustrating an extended bit format method, according to one or more embodiments.

Referring to FIG. 12, the extended bit format method may be a format for representing a positive or negative number having an absolute value greater than an absolute value of a subnormal number, and smaller than an absolute value of a normal number that is representable in an n-bit, for example, where n=16, as a non-limiting example, format. That is, the extended normal number according to this extended bit format method may correspond to a value between the subnormal number and the normal number.

Referring to a decoding table 1210, according to this extended bit format method, when a binary value normalized by an FP16 multiplier is a normal number or a subnormal number that is representable in an FP16 format, an extension pin may have a value of "0," and when the binary value normalized by the FP16 multiplier is an extended normal number, the extension pin may have a value of "1."

When the extension pin is "0," a decoding table defining the normal number, infinity and NaN may be similar to the decoding table 520 of FIG. 5 above, for example. However, when the extension pin is "0," a decoding table defining 0 and the subnormal number may also be similar to the decoding table 520 of FIG. 5 above. This property occurs because the extended normal number is defined as a value between the subnormal number and the normal number.

According to the decoding table 1210, an expression representing 0 and the subnormal number may be $(-1)^{signbit} \times 2^{-46} \times 0.significantbits_2$.

An FP value in the case where the extension pin is "1" may correspond to the extended normal number, and may have a range of values between the subnormal number and the normal number. An expression representing the extended normal number is $(-1)^{signbit} \times 2^{exponent-46} \times 1.significantbits_2$. That is, the expression may be different from an expression representing the extended normal number in the extended bit format of the method of any of FIGS. 9-11, for example. Thus, returning to FIG. 12 and this extended bit format method, the extended normal number may be a positive number between $2^{-15} \times (1+1023/1024)$ and $2^{-46} \times (1+0/1024)$, or a negative number between $(-1) \times 2^{-46} \times (1+1023/1024)$ and $(-1) \times 2^{-15} \times (1+0/1024)$.

A dynamic range 1220 of this extended bit format method may correspond to a dynamic range of positive normal numbers from $2^{-14}$ to $2^{15}$, a dynamic range of positive extended normal numbers from $2^{-46}$ to $2^{-15}$, and a dynamic range of positive subnormal numbers from $2^{-56}$ to $2^{-47}$. That is, the extended bit format, also referred to as an extended FP16 format, may represent FP values between subnormal numbers and normal numbers by adding the extension pin of 1 bit, according to one or more embodiments.

FIG. 13 is a flowchart for illustrating a method of encoding a result of an FP multiplication operation by using an extended bit format method, according to one or more embodiments.

Referring to FIG. 13, in operation 1301, the FP multiplier 1110, such as that of the one or more embodiments of FIG. 7, that is, corresponding to an FP16 multiplier, included in the processor 110, such as that of FIG. 7, may obtain an exponent of a binary value normalized by the normalizer 1040, such as that of FIG. 10, while performing a multiplication operation between a first FP operand and a second FP operand in an FP 16 format.

In operation 1302, the processor 110 may determine whether the exponent of the normalized binary value satisfies the condition of a dynamic range of "exponent<−14." That is, when the exponent of the normalized binary value is included in a dynamic range of normal numbers representable in the FP16 format, the processor 110 may determine that the normalized binary value is the normal number. Accordingly, when the exponent is greater than or equal to −14, the processor 110 may perform operation 1303. However, when the exponent is smaller than −14, the processor 110 may perform operation 1304.

In operation 1303, when the exponent is greater than or equal to −14, the processor 110 may encode the normalized binary value into the extended bit format corresponding to the normal number. At this time, in the extended bit format, an extension pin may have a value of "0," so extpin[0]=0.

In operation 1104, the processor 110 may determine whether the exponent satisfies the condition of a dynamic range of "exponent<−46." That is, the processor 110 may determine that the normalized binary value may be an extended normal number when the exponent is not included in the dynamic range of normal numbers but is included in the dynamic range of subnormal numbers. Accordingly, when the exponent is greater than or equal to −46, the processor 110 may perform operation 1305. However, when the exponent is smaller than −46, the processor 110 may perform operation 1306.

In operation 1305, when the exponent is greater than or equal to −46, the processor 110 may encode the normalized binary value into the extended bit format corresponding to the extended normal number. At this time, in the extended bit format, the extension pin may have a value of "1," such that ext_pin[0]=1.

In operation 1306, when the exponent is smaller than −46, the processor 110 may determine that the normalized binary value corresponds to a subnormal number. That is, the processor 110 may determine that the normalized binary value is the subnormal number, when the exponent is not included in the dynamic range of normal numbers and the dynamic range of extended normal numbers. Accordingly, the processor 110 may encode the normalized binary value in the extended bit format corresponding to the subnormal number. At this time, in the extended bit format, the extension pin may have a value of "0," such that ext_pin[0]=0.

Moreover, referring to the one or more embodiments of FIGS. 7 to 13, an FP multiplier architecture for processing the extended bit format may be implemented so as to be compatible with the existing FP multiplier architecture. Specifically, the FP multiplier architecture one or more embodiments processing the extended bit format may include an additional logic circuit that identifies 1 bit of extended pin data extpin[0] from an output of a normalizer in the existing FP multiplier architecture and may not otherwise modify the existing FP multiplier architecture, and thus, the FP multiplier architecture of one or more embodiments may be implemented so as to be compatible with the existing FP multiplier architecture. For example, the FP16 multiplier architecture described in the one or more embodiments of FIGS. 7 to 13 may be compatible with the existing FP16 multiplier architecture, e.g., except that the FP16 multiplier architecture described in any or all of FIGS. 7 to 13 may support any or all extended bit formats described herein. In addition, the FP multiplier architecture supporting the extended bit format according to one or more embodiments may be implemented so as to be compatible with existing FP multiplier architectures of other precisions.

Figure 14:
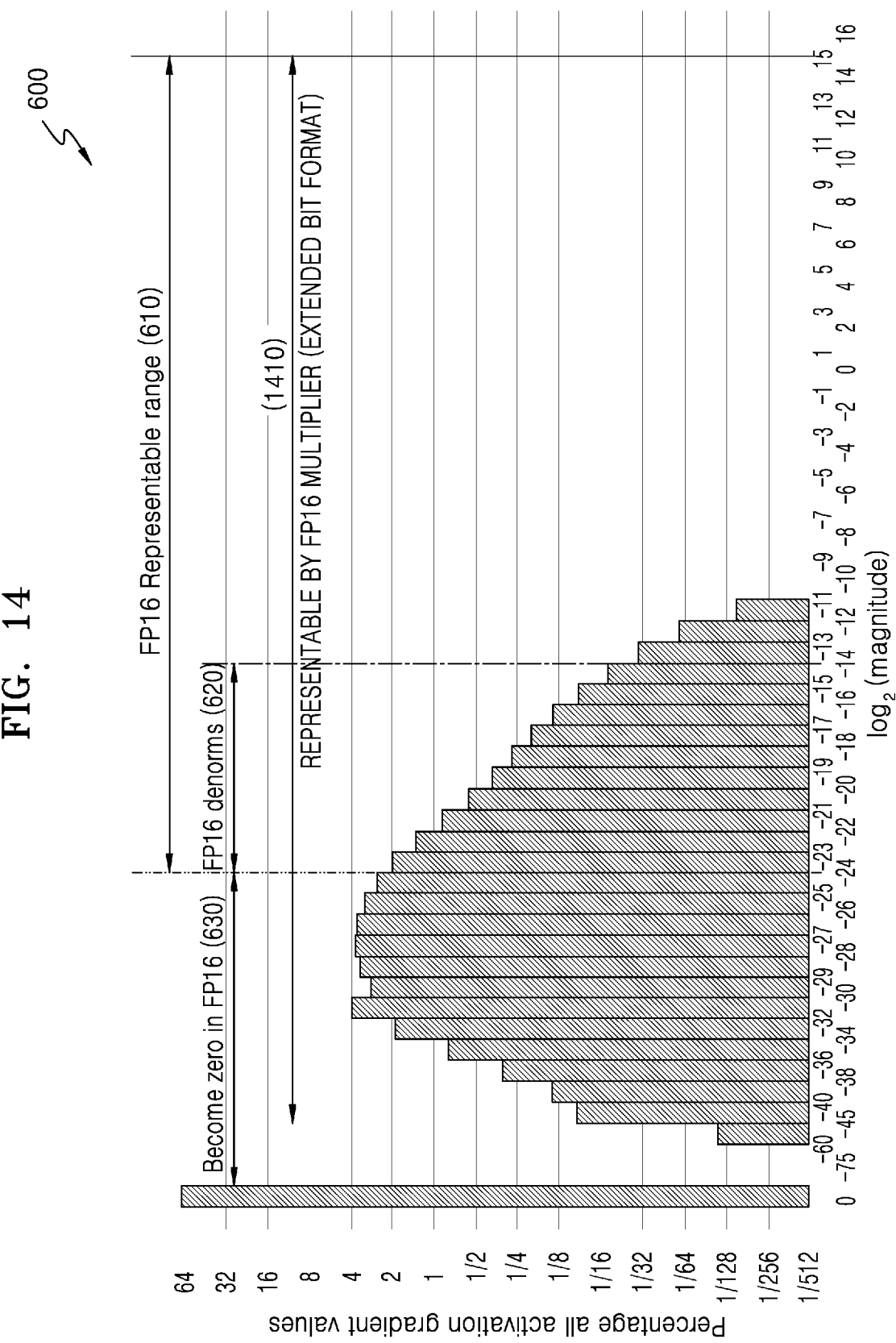
FIG. 14 is a diagram illustrating an extension of an FP range representable by an FP16 multiplier using an extended bit format, according to one or more embodiments.

FIG. 14 is a diagram illustrating an extension of an FP range representable by an FP16 multiplier, using an extended bit format, according to one or more embodiments.

Referring to the one or more embodiments of FIG. 14, as described above with reference to FIG. 6, results of a typical multiplication operation corresponding to FPs included in the dynamic range 630 of the histogram 600 are output as 0 when the multiplication operation is performed by the FP16 multiplier. However, when the multiplication operation is performed by the FP16 multiplier using the extended bit format defined in one or more embodiments, the FPs in a dynamic range 1410 that may include a part of the dynamic range 630 may be representable by using the extended bit format including the extension pin or ext_pin[0], along with an FP16 format, as defined in the decoding table 910 or 1210 discussed in greater detail, above.

Figure 15:
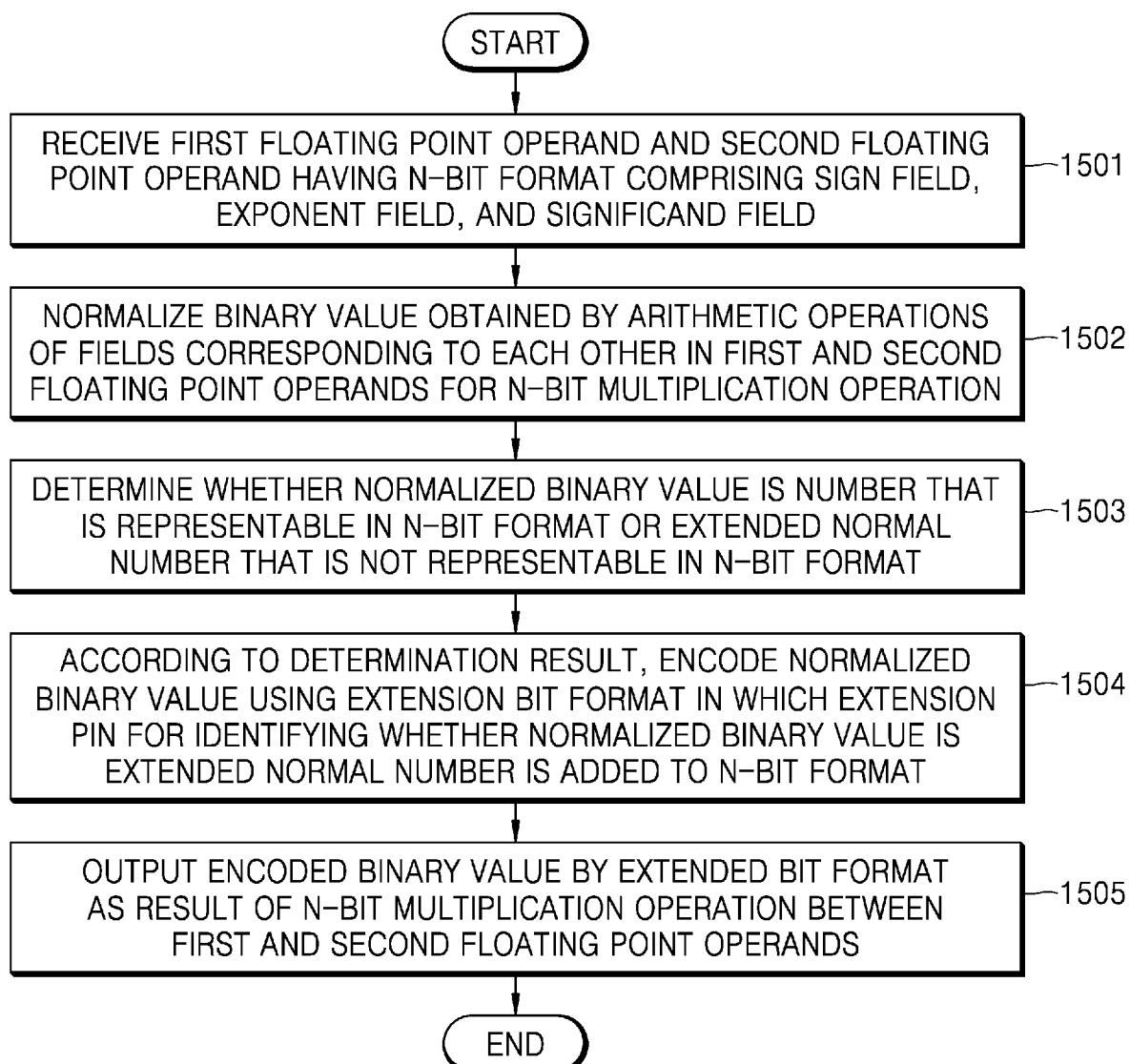
FIG. 15 is a flowchart of a method, performed by a processing apparatus, with processing of an FP operation, according to one or more embodiments.

FIG. 15 is a flowchart of a method, performed by a processing apparatus, of processing an FP operation, according to one or more embodiments. Referring to FIG. 15, the method, performed by the processing apparatus 100, such as that of FIG. 7, of processing the FP operation may be related to the one or more embodiments described in the drawings above, and thus, even if not restated below, the descriptions provided in the drawings above may also be applied to the method of FIG. 15.

In operation 1501, the processor 110, such as that of the one or more embodiments of FIG. 7, may receive a first FP operand and a second FP operand having an n-bit format including a sign field, an exponent field, and a significand field, where n is a natural number.

In operation 1502, the processor 110 may normalize a binary value obtained by arithmetic operations of the fields, corresponding to each other in the FP operands, for an n-bit multiplication operation.

In operation 1503, the processor 110 may determine whether the normalized binary value is a number representable in the n-bit format or an extended normal number that is not representable in the n-bit format.

In operation 1504, the processor 110 may encode the normalized binary value, by using an extended bit format in which an extension pin for identifying whether the normalized binary value is the extended normal number is added to the n-bit format according to a determination result.

In operation 1505, the processor 110 may output the binary value encoded by the extended bit format, as a result of an n-bit multiplication operation between the FP operands.

Moreover, in the above description, a non-limiting example of performing a multiplication operation of FP16 operands using the FP16 multiplier in a MAC operation of a neural network has been described. That is, the architecture of the FP multiplier 1000, the extended bit format of the decoding table 910 or 1210, and the dynamic ranges 920 and 1220 are all described as being defined with respect to the FP16 format. However, the examples may be similarly modified and similar principles may be applied to FP formats of other precisions, such as lower precisions or higher precisions. For example, examples existing in which the embodiments may be modified and applied to implement an extended bit format, a dynamic range, an architecture of an FP8 multiplier, and similar constructs for the multiplication operation of FP8 operands. The one or more embodiments exist with various examples applied to implement an architecture of the FP32 multiplier for a multiplication operation of higher precision operands, for example, FP32), an extended bit format, a dynamic range, and so on.

Figure 16:
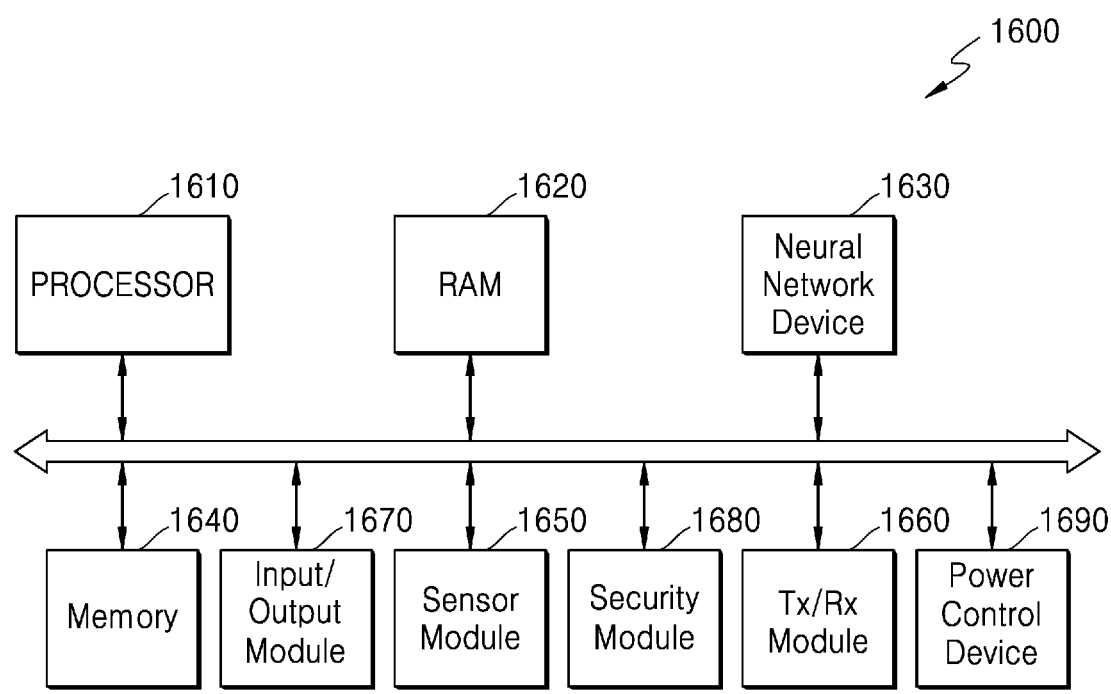
FIG. 16 is a block diagram illustrating an electronic system, according to one or more embodiments.

FIG. 16 is a block diagram illustrating an electronic system 1600, according to one or more embodiments.

Referring to FIG. 16, the electronic system 1600 may extract valid information by analyzing input data in real time based on a neural network. The electronic system 1600 may also determine a situation based on the extracted information or control configurations of an electronic device, on which the electronic system 1600 is mounted. The electronic device may also be the electronic system 1600. For example, the electronic system 1600 may be, or applied to, a robot device such as a drone, an advanced driver assistance system (ADAS), and similar systems, as well as a smart TV, a smart phone, a medical device, a mobile device, an image display device, a measurement device, an IoT device, and so on, and may be, or mounted on or otherwise coupled, to at least one of these various kinds of electronic devices.

The electronic system 1600 may include a processor 1610, RAM 1620, a neural network device 1630, a memory 1640, a sensor module 1650, and a communication module 1660, according to a non-limiting example. The electronic system 1600 may further include other elements in addition to or in lieu of these enumerated examples, such as an input/output module 1670, a security module 1680, a power control device 1690, and so on. For example, some of the hardware configurations of the electronic system 1600 may be mounted on, or as, at least one semiconductor chip. The neural network device 1630 may be a device including the processing apparatuses described above with reference to the one or more embodiments of FIGS. 7-15 and may be a hardware accelerator dedicated to executing the neural network or a device including such a hardware accelerator, where the hardware accelerator may include hardware dedicated to executing a neural network or operations for supporting a neural network more efficiently. The processing apparatuses of FIGS. 7-15 may also be the electronic system 1600.

The processor 1610 may control the overall operation of the electronic system 1600. The processor 1610 may include one processor core, or a single core processor, or a plurality of processor cores, or a multi-core processor. The processor 1610 may process or execute instructions and/or data stored in the memory 1640. In one or more embodiments, the processor 1610 may control the function of the neural network device 1630 by executing the instructions stored in the memory 1640. The processor 1610 may be implemented as a CPU, a GPU, an AP, or another type of processor, as non-limiting examples. Through the execution of instructions, the processor 1610 may be configured to perform one or more or all operations and methods described herein.

The RAM 1620 may temporarily store instructions, data, or applications. For example, the programs and/or data stored in the memory 1640 may be temporarily stored in the RAM 1620 under the control of or based on booting code of the processor 1610. For example, the RAM 1620 may be implemented as a memory such as dynamic RAM (DRAM) or static RAM (SRAM), as non-limiting examples.

The neural network device 1630 may perform an operation of the neural network based on the received input data and may generate an information signal based on a result of the operation. The neural network may include, but is not limited to, a convolutional neural network (CNN), a recurrent neural network (RNN), a deep belief network, a restricted Boltzmann machine, as non-limiting examples. The neural network device 1630 may include hardware that performs processing using the neural network, and may correspond to a hardware accelerator dedicated to the neural network including the processing apparatuses described with reference to FIGS. 7-15, for example.

The information signal may include one of various types of recognition signals such as a speech recognition signal, an object recognition signal, an image recognition signal, and a biometric information recognition signal, as non-limiting examples. For example, the neural network device 1630 may receive frame data included in a video stream as input data, and may generate a recognition signal with respect to an object included in an image represented by the frame data from the frame data. However, the neural network device 1630 is not limited to these specific enumerated examples, and the neural network device 1630 may receive various types of input data according to the type or function of the electronic device on which the electronic system 1600 is, or is mounted, or to which the electronic system 1600 is coupled, and may generate a recognition signal according to the input data.

The memory 1640 may be a storage location for storing data, and may store an operating system (OS), various programs, and various kinds of data. In one or more embodiments, the memory 1640 may store neural network data, such as, FP type or fixed point type input/output activations, weights, and so on, generated during a process of performing the operation of the neural network device 1630. In one or more embodiments, the memory 1640 may store parameters for a mixed precision MAC operation, as described in greater detail, above. In addition, the memory 1640 may also store parameters encoded by an extended bit format.

The memory 1640 may be a DRAM, but is not limited thereto. The memory 1640 may include at least one of volatile memory and nonvolatile memory. For example, the nonvolatile memory may include ROM, PROM, EPROM, EEPROM, flash memory, PRAM, MRAM, RRAM, FRAM and the like, as non-limiting examples. The volatile memory may include DRAM, SRAM, SDRAM, PRAM, MRAM, RRAM, FeRAM and the like, as non-limiting examples. In an embodiment, the memory 1640 may also include at least one of HDD, SSD, CF, SD, Micro-SD, Mini-SD, xD, and Memory Stick memories, which provide durable storage capabilities.

In an example, the sensor module 1650 may collect information around the electronic device on which the electronic system 1600 is mounted, or around the electronic system, wherein the electronic system is the electronic device. For example, the sensor module 1650 may sense or receive a signal, for example, an image signal, a speech signal, a magnetic signal, a biometric signal, a touch signal, and so on, from the outside of the electronic device, and may convert the sensed or received signal into data. To this end, the sensor module 1650 may include at least one of various types of sensing devices. For example, sensing devices may include a microphone, an imaging device, an image sensor, a light detection and ranging (LIDAR) sensor, an ultrasonic sensor, an infrared sensor, a bio sensor, and a touch sensor, as non-limiting examples.

The sensor module 1650 may provide the converted data to the neural network device 1630 as input data. For example, the sensor module 1650 may include an image sensor, may generate a video stream by capturing an external environment of the electronic device, and may sequentially provide consecutive data frames of the video stream to the neural network device 1630 as the input data, as a non-limiting example. However, the sensor module 1650 is not limited to this particular example, and the sensor module 1650 may provide various other types of data to the neural network device 1630, in other examples.

The communication module 1660 may include various wired or wireless interfaces for communicating with an external device. For example, the communication module 1660 may include a communication interface capable of accessing a mobile cellular network such as a wired local area network (LAN), a wireless local area network (WLAN), such as a wireless fidelity (Wi-Fi) network, a wireless personal area network (WPAN) such as a Bluetooth (Bluetooth), Wireless Universal Serial Bus (USB), Zigbee, Near Field Communication (NFC), Radio-frequency identification (RFID), Power Line communication (PLC), or 3rd Generation (3G), $4^{th}$ Generation (4G), Long Term Evolution (LTE), 5th Generation (5G), and so on.

In an one or more examples, the communication module 1260 may receive data regarding a quantized neural network from the outside of the communication module 1260. Here, the outside of the communication module may refer to a device that may perform neural network training based on a large amount of data, may quantizes the trained neural network to a certain fixed point type, and may provide the quantized neural network data to the electronic system 1200. The received quantized neural network data may be stored in the memory 1240.

The processing apparatuses, processing apparatus 100, processors, processor 110, memories, memory 120, MAC operators, MAC operator 1100, FP multipliers, FP multiplier 1000, XOR logic circuit 1010, adder 1021, subtractor 1022, multiplier 1030, normalizer 1040, FP multiplier 1110, FP accumulator 1120, electronic system 1600, processor 1610, RAM 1620, neural network device 1630, memory 1640, sensor module 1650, and communication module 1660 in FIGS. 1-16 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
    receiving, at the processor, a first floating point operand and a second floating point operand, each having an n-bit format comprising a sign field, an exponent field, and a significand field, wherein n is a natural number;
    performing, by a multiply-and-accumulate (MAC) operator within the processor, a MAC operation,
    wherein the MAC operator comprises an n-bit multiplier that performs an n-bit multiplication operation and an m-bit accumulator, and wherein m is a natural number greater than n;
    performing arithmetic operations including;
        performing, by an adder within the n-bit multiplier, an addition operation on the exponent field of the first floating point operand and the exponent field of the second floating point operand;
        performing, by a subtractor within the n-bit multiplier, a subtraction operation of subtracting a bias corresponding to the n-bit format from a result of the addition operation; and
        performing, by a multiplier within the n-bit multiplier, a multiplication operation on the significand field of the first floating point operand and the significand field of the second floating point operand;
    normalizing, by a normalizer within the n-bit multiplier, a binary value obtained by the performing of the arithmetic operations for fields corresponding to each other in the first and second floating point operands for the n-bit multiplication operation;
    determining, by the normalizer, whether the normalized binary value is a number that is representable in the n-bit format or an extended normal number that is not representable in the n-bit format;
    according to a result of the determining, encoding, by the normalizer, the normalized binary value using an extension bit format in which an extension pin identifying whether the normalized binary value is the extended normal number is added to the n-bit format; and
    outputting the encoded binary value, by the processor, using the extended bit format, as a result of the n-bit multiplication operation between the first and second floating point operands,
    wherein the extension pin has a first value in response to the normalized binary value being a normal number or a subnormal number that is representable in the n-bit format, and has a second value in response to the normalized binary value being the extended normal number.

2. The method of claim 1, wherein
    the number that is representable in the n-bit format is a normal number or a subnormal number, and
    the extended normal number is not included in a dynamic range of the normal number and is not included in a dynamic range of the subnormal number.

3. The method of claim 2, wherein the determining comprises:
    determining whether the normalized binary value is the normal number, the subnormal number, or the extended normal number, based on an exponent of the normalized binary value.

4. The method of claim 1, wherein the arithmetic operations are convolution operations.

5. The method of claim 1, wherein a dynamic range of the extended normal number is a range representing a positive number or a negative number having an absolute value that is smaller than an absolute value of a subnormal number that is representable in the n-bit format.

6. The method of claim 5, wherein the determining comprises:
    when an exponent of the normalized binary value is included in a dynamic range of a normal number that is representable in the n-bit format, determining that the normalized binary value is the normal number;
    when the exponent of the normalized binary value is not included in the dynamic range of the normal number and is included in a dynamic range of the subnormal number, determining that the normalized binary value is the subnormal number; and
    when the exponent of the normalized binary value is not included in the dynamic range of the normal number and the dynamic range of the subnormal number, determining that the normalized binary value is the extended normal number.

7. The method of claim 1, wherein a dynamic range of the extended normal number is a range representing a positive number or a negative number having an absolute value greater than an absolute value of a subnormal number that is representable in the n-bit format and having an absolute value less than an absolute value of a normal number that is representable in the n-bit format.

8. The method of claim 7, wherein the determining comprises:
    when an exponent of the normalized binary value is included in a dynamic range of the normal number that is representable in the n-bit format, determining that the normalized binary value is the normal number;

when the exponent of the normalized binary value is not included in the dynamic range of the normal number and is included in a dynamic range of the extended normal number, determining that the normalized binary value is the extended normal number; and when the exponent of the normalized binary value is not included in the dynamic range of the normal number and the dynamic range of the extended normal number, determining that the normalized binary value is the subnormal number.

9. The method of claim 1, wherein
a value of n is 16,
the n-bit format is a half precision floating point format,
the n-bit multiplication operation is a 16-bit multiplication operation using a 16-bit multiplier, and
in the n-bit format, the sign field comprises 1 bit, the exponent field comprises 5 bits, and the significand field comprises 10 bits.

10. The method of claim 9, wherein
the extended normal number is a positive number between $2^{-25} \times (1+1023/1024)$ and $2^{-56} \times (1+0/1024)$, or a negative number between $(-1) \times 2^{-56} \times (1+1023/1024)$ and $(-1) \times 2^{-25} \times (1+0/1024)$.

11. The method of claim 1, wherein the normalizing comprises:
normalizing the binary value obtained based on a result of the subtraction operation and a result of the multiplication operation.

12. The method of claim 1, wherein
the n-bit multiplication operation corresponds to part of a multiply-and-accumulate (MAC) operation of a neural network, and
the encoded binary value is provided for an accumulation operation with a third floating point operand of m bits, wherein m is a natural number greater than n.

13. A non-transitory computer-readable storage medium storing instructions that, when executed by one or more processors, cause the one or more processors to perform the method of claim 1.

14. An apparatus, the apparatus comprising:
one or more processors configured to:
receive a first floating point operand and a second floating point operand, each having an n-bit format comprising a sign field, an exponent field, and a significand field, wherein n is a natural number;
the one or more processors each comprise a multiply-and-accumulate (MAC) operator configured to perform a MAC operation,
wherein the MAC operator comprises an n-bit multiplier that performs an n-bit multiplication operation and an m-bit accumulator, wherein m is a natural number greater than n,
wherein the n-bit multiplier comprises:
an adder configured to perform an addition operation on the exponent field of the first floating point operand and the exponent field of the second floating point operand,
a subtractor configured to perform a subtraction operation of subtracting a bias corresponding to the n-bit format from a result of the addition operation,
a multiplier configured to perform a multiplication operation on the significand field of the first floating point operand and the significand field of the second floating point operand, and a normalizer configured to
normalize a binary value obtained based on a result of the subtraction operation and the result of the multiplication operation for the n-bit multiplication operation;
determine whether the normalized binary value is a number that is representable in the n-bit format or an extended normal number that is not representable in the n-bit format;
according to a result of the determination, encode the normalized binary value using an extension bit format in which an extension pin for identifying whether the normalized binary value is the extended normal number is added to the n-bit format; and
output the encoded binary value using the extended bit format as a result of the n-bit multiplication operation between the first and second floating point operands,
wherein the extension pin has a first value when the normalized binary value is a normal number or a subnormal number that is representable in the n-bit format, and has a second value when the normalized binary value is the extended normal number.

15. The apparatus of claim 14, further comprising a memory storing instructions, which, when executed by the one or more processors, configure the one or more processors to perform the normalization, the determination, the encoding, and the output of the encoded binary value.

16. The apparatus of claim 14, wherein
the number that is representable in the n-bit format is a normal number or a subnormal number, and
the extended normal number is not included in a dynamic range of the normal number and is not included in a dynamic range of the subnormal number.

17. The apparatus of claim 16, wherein the one or more processors are further configured to determine whether the normalized binary value is the normal number, the subnormal number, or the extended normal number, based on an exponent of the normalized binary value.

18. The apparatus of claim 14, wherein the addition operation of the adder, the subtraction operation of the subtractor, and the multiplication operation of the multiplier are convolution operations.

19. The apparatus of claim 14, wherein a dynamic range of the extended normal number is a range representing a positive number or a negative number having an absolute value smaller than an absolute value of a subnormal number that is representable in the n-bit format.

20. The apparatus of claim 14, wherein a dynamic range of the extended normal number is a range representing a positive number or a negative number having an absolute value greater than an absolute value of a subnormal number that is representable in the n-bit format and that is smaller than an absolute value of a normal number that is representable in the n-bit format.

21. The apparatus of claim 14, wherein
a value of n is 16,
the n-bit format is a half precision floating point format,
the n-bit multiplication operation is a 16-bit multiplication operation using a 16-bit multiplier,
in the n-bit format, the sign field comprises 1 bit, the exponent field comprises 5 bits, and the significand field comprises 10 bits, and
the extended normal number is
a positive number between $2^{-25} \times (1+1023/1024)$ and $2^{-56} \times (1+0/1024)$, or a negative number between $(-1) \times 2^{-56} \times (1+1023/1024)$ and $(-1) \times 2^{-25} \times (1+0/1024)$.

22. The apparatus of claim 14,
wherein the MAC operator is configured to:
perform an accumulation operation on the encoded binary value and a third floating point operand of m bits using the accumulator.

\* \* \* \* \*